United States Patent
Omori

(10) Patent No.: US 9,392,244 B2
(45) Date of Patent: Jul. 12, 2016

(54) TRANSMITTING APPARATUS FOR TRANSMITTING IMAGE DATA WITH ID INFORMATION AND TIME CODE INFORMATION AND RECEIVING APPARATUS

(71) Applicant: CANON KABUSHIKI KAISHA, Tokyo (JP)

(72) Inventor: Noboru Omori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 165 days.

(21) Appl. No.: 13/859,317

(22) Filed: Apr. 9, 2013

(65) Prior Publication Data

US 2013/0272674 A1    Oct. 17, 2013

(30) Foreign Application Priority Data

Apr. 11, 2012    (JP) ................. 2012-090603

(51) Int. Cl.
  *H04N 5/77* (2006.01)
  *H04N 9/79* (2006.01)
  *H04N 5/765* (2006.01)

(52) U.S. Cl.
  CPC ............ *H04N 9/79* (2013.01); *H04N 5/772* (2013.01); *H04N 5/765* (2013.01)

(58) Field of Classification Search
  CPC ......... H04N 5/77; H04N 5/765; H04N 7/06; H04N 7/063; H04N 7/066; H04N 5/44; H04N 5/38; H04N 5/775; H04N 5/772; H04N 9/79; H04L 1/06; H04H 20/28
  USPC ............ 386/210, 239, 224, 231; 348/388.1, 348/389.1; 360/22
  See application file for complete search history.

(56) References Cited

U.S. PATENT DOCUMENTS 5,420,866 A * 5/1995 Wasilewski ............ H04H 60/15
  348/474
5,568,205 A   10/1996 Hurwitz
  (Continued)

FOREIGN PATENT DOCUMENTS

JP    361126666 A  *  6/1986
JP    9-186959 A      7/1997
  (Continued)

OTHER PUBLICATIONS

U.S. Appl. No. 13/859,264, filed Apr. 9, 2013, Noboru Omori.

*Primary Examiner* — David Harvey
(74) *Attorney, Agent, or Firm* — Canon USA, Inc., IP Division

(57) ABSTRACT

A transmitting apparatus generates moving image data including first image data and second image data, and generates first time code information corresponding to the first image data and second time code information corresponding to the second image data. The transmitting apparatus transmits, to an external apparatus, the first image data included in the moving image data and the first time code information corresponding to the first image data, and transmits, to the external apparatus, the second image data included in the moving image data and the second time code information corresponding to the second image data. The transmitting apparatus determines, in accordance with a first condition, the first image data from a plurality of image data included in the moving image data, and determines the second image data, in accordance with a second condition, from the plurality of image data included in the moving image data.

17 Claims, 17 Drawing Sheets

(56) References Cited

U.S. PATENT DOCUMENTS

| | | | |
|---|---|---|---|
| 6,026,434 A | 2/2000 | Kubota et al. | |
| 6,404,818 B1 * | 6/2002 | Obikane | H04N 21/23608 348/500 |
| 6,564,002 B1 | 5/2003 | Murakami et al. | |
| 6,611,652 B1 | 8/2003 | Iwamoto et al. | |
| 6,694,088 B1 | 2/2004 | Sakai | |
| 7,298,963 B2 | 11/2007 | Ueda et al. | |
| 7,340,764 B2 * | 3/2008 | Kubota | H04L 29/06 348/E5.003 |
| 7,480,252 B2 * | 1/2009 | Van Der Schaar | 370/252 |
| 7,526,180 B2 | 4/2009 | Itoh | |
| 8,483,269 B2 * | 7/2013 | Kim | H04H 20/95 345/419 |
| 8,897,322 B1 * | 11/2014 | Woleben | H04H 20/28 370/265 |
| 2002/0116715 A1 | 8/2002 | Apostolopoulos | H04L 29/06 725/86 |
| 2004/0160971 A1 * | 8/2004 | Krause | H04L 12/5693 370/412 |
| 2004/0233938 A1 * | 11/2004 | Yamauchi | H04N 21/2365 370/537 |
| 2005/0008327 A1 | 1/2005 | Shinkai | |
| 2006/0271990 A1 * | 11/2006 | Rodriguez | H04N 21/234309 725/118 |
| 2006/0285149 A1 | 12/2006 | Dei | |
| 2007/0247477 A1 * | 10/2007 | Lowry et al. | 345/629 |
| 2008/0002949 A1 | 1/2008 | Tokunaka et al. | |
| 2009/0034627 A1 * | 2/2009 | Rodriguez | H04N 21/23608 375/240.26 |
| 2009/0225870 A1 * | 9/2009 | Narasimhan | H04N 7/52 375/240.26 |
| 2009/0231492 A1 | 9/2009 | Wayne et al. | |
| 2010/0033622 A1 | 2/2010 | Bellers et al. | |
| 2010/0157090 A1 * | 6/2010 | Kobayashi | H04N 5/77 348/222.1 |
| 2010/0199301 A1 * | 8/2010 | Hayashi | H04H 20/28 725/32 |
| 2011/0050851 A1 * | 3/2011 | Chen | H04N 13/0029 348/43 |
| 2011/0205428 A1 * | 8/2011 | Yamashita | H04N 7/12 348/443 |
| 2012/0154609 A1 | 6/2012 | Ozaki | |
| 2012/0189286 A1 | 7/2012 | Takayama et al. | |
| 2013/0058618 A1 | 3/2013 | Akazawa et al. | |
| 2013/0271669 A1 * | 10/2013 | Omori | H04N 5/38 348/723 |
| 2013/0272674 A1 * | 10/2013 | Omori | 386/224 |

FOREIGN PATENT DOCUMENTS

| | | |
|---|---|---|
| JP | H10-234019 A | 9/1998 |
| JP | 2004-007148 A | 1/2004 |
| JP | 2007-531377 A | 11/2007 |
| JP | 2010-212746 A | 9/2010 |
| JP | 2011-244294 A | 12/2011 |
| WO | 2004-075548 A1 | 9/2004 |

* cited by examiner

TRANSMITTING APPARATUS FOR TRANSMITTING IMAGE DATA WITH ID INFORMATION AND TIME CODE INFORMATION AND RECEIVING APPARATUS

BACKGROUND OF THE INVENTION

1. Field of the Invention

The present invention relates to an image data transmitting apparatus (e.g., an image capture apparatus) that can transmit moving image data which includes image data corresponding to a plurality of frames via a plurality of transmission paths to an external apparatus (e.g., an external recording apparatus or an external display apparatus), and an image data receiving apparatus that can receive moving image data which includes image data corresponding to a plurality of frames.

2. Description of the Related Art

According to a conventional system discussed in Japanese Patent Application Laid-Open No. 9-186959, an image capture apparatus is connected to a camera control unit via a single cable, and the image capture apparatus can transmit a video signal to an external apparatus.

According to a conventional system discussed in Japanese Patent Application Laid-Open No. 2011-244294, an image capture apparatus is connected to an external recording apparatus via a single cable, and the image capture apparatus can transmit moving image data to the external recording apparatus.

However, the following problem occurs in a system including an image data transmitting apparatus (e.g., an image capture apparatus) and an external apparatus (e.g., an external recording apparatus or an external display apparatus) that are connected via a single transmission path. For example, due to transmission path limitations, moving image data having an image size (e.g., the number of pixels in the horizontal and vertical directions) larger than 1920×1080 cannot be transmitted. Such a system cannot transmit 4096×2160, 4096×1080, or 2048×1080 moving image data too.

The above-mentioned problem may be solved if the system includes two or more transmission paths that connect the image data transmitting apparatus and the external apparatus. However, when two or more transmission paths are provided in the system, it is necessary to determine a method for transmitting moving image data which includes image data corresponding to a plurality of frames via respective transmission paths.

Further, when two or more transmission paths are provided in the system, it is necessary to determine a configuration and a method for correctly rearranging image data corresponding to a plurality of frames received via respective transmission paths.

SUMMARY OF THE INVENTION

According to an aspect of the present invention, at least one of the above-described drawbacks and disadvantages can be overcome.

According to another aspect of the present invention, moving image data having an image size (e.g., the number of pixels in the horizontal and vertical directions) larger than 1920×1080 can be transmitted via a plurality of transmission paths.

According to another aspect of the present invention, if moving image data includes image data corresponding to a plurality of frames to be transmitted from a transmitting apparatus to an external apparatus via a plurality of transmission paths, the image data corresponding to the plurality of frames can be rearranged correctly.

According to another aspect of the present invention, a transmitting apparatus includes a moving image data generating unit that generates moving image data including first image data and second image data; a time code information generating unit that generates first time code information corresponding to the first image data and second time code information corresponding to the second image data; a first transmitting unit that transmits, to an external apparatus, the first image data included in the moving image data and the first time code information corresponding to the first image data; a second transmitting unit that transmits, to the external apparatus, the second image data included in the moving image data and the second time code information corresponding to the second image data; and a determination unit that determines, in accordance with a first condition, the first image data from a plurality of image data included in the moving image data, and determines, in accordance with a second condition, the second image data from the plurality of image data included in the moving image data.

According to another aspect of the present invention, a method includes generating moving image data including first image data and second image data; generating first time code information corresponding to the first image data and second time code information corresponding to the second image data; transmitting, to an external apparatus, the first image data included in the moving image data and the first time code information corresponding to the first image data; transmitting, to the external apparatus, the second image data included in the moving image data and the second time code information corresponding to the second image data; determining, in accordance with a first condition, the first image data from a plurality of image data included in the moving image data; and determining, in accordance with a second condition, the second image data from the plurality of image data included in the moving image data.

According to another aspect of the present invention, a non-transitory computer-readable storage medium stores a program for causing a computer to execute a method. The method includes generating moving image data including first image data and second image data; generating first time code information corresponding to the first image data and second time code information corresponding to the second image data; transmitting, to an external apparatus, the first image data included in the moving image data and the first time code information corresponding to the first image data; transmitting, to the external apparatus, the second image data included in the moving image data and the second time code information corresponding to the second image data; determining, in accordance with a first condition, the first image data from a plurality of image data included in the moving image data; and determining, in accordance with a second condition, the second image data from the plurality of image data included in the moving image data.

According to another aspect of the present invention, a receiving apparatus includes a first receiving unit, from an external apparatus, that receives first image data included in moving image data and first time code information corresponding to the first image data; a second receiving unit that receives, from the external apparatus, second image data included in the moving image data and second time code information corresponding to the second image data; and a determination unit that determines, in accordance with the first time code information and the second time code information, an order of the first image data and the second image data.

According to another aspect of the present invention, a method includes receiving, from an external apparatus, first image data included in moving image data and first time code information corresponding to the first image data; receiving, from the external apparatus, second image data included in the moving image data and second time code information corresponding to the second image data; and determining, in accordance with the first time code information and the second time code information, an order of the first image data and the second image data.

According to another aspect of the present invention, a non-transitory computer-readable storage medium stores a program for causing a computer to execute a method. The method includes receiving, from an external apparatus, first image data included in moving image data and first time code information corresponding to the first image data; receiving, from the external apparatus, second image data included in the moving image data and second time code information corresponding to the second image data; and determining, in accordance with the first time code information and the second time code information, an order of the first image data and the second image data.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the present invention and, together with the description, serve to explain the principles of the present invention.

DESCRIPTION OF THE EMBODIMENTS

Various exemplary embodiments, features, and aspects of the present invention will be described in detail below with reference to the drawings.

First Exemplary Embodiment

Figure 1:
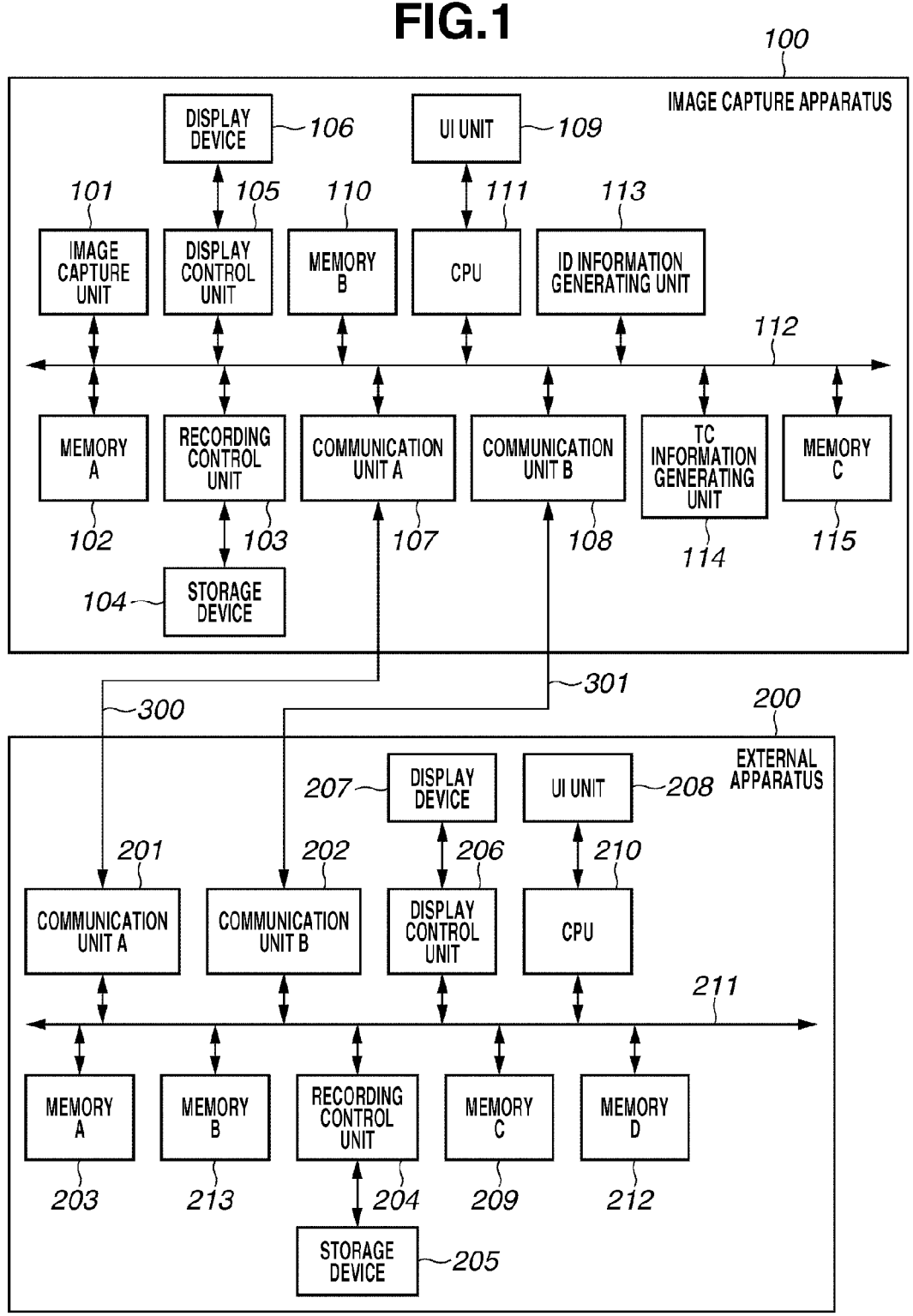
FIG. 1 is a block diagram illustrating constituent components of an image data transmitting system according to a first exemplary embodiment.

First, constituent components of an image data transmitting system according to a first exemplary embodiment are described with reference to FIG. 1. FIG. 1 is a block diagram illustrating components constituting the image data transmitting system according to the first exemplary embodiment.

The image data transmitting system according to the first exemplary embodiment includes an image capture apparatus 100 that can act as an image data transmitting apparatus and an external apparatus 200 that can act as an image data receiving apparatus. The image capture apparatus 100 can be any apparatus that can act as a digital video camera. Accordingly, the image capture apparatus 100 can be any apparatus that can act as a mobile phone with a camera. Further, the image capture apparatus 100 can be any apparatus that can act as a computer with a camera. The external apparatus 200 can be any apparatus that can act as an external recording apparatus or an external display apparatus.

The image capture apparatus 100 can be connected to the external apparatus 200 via a plurality of transmission paths. For example, as illustrated in FIG. 1, the image capture apparatus 100 and the external apparatus 200 are connected to each other via two transmission paths. A cable 300 is a first transmission path that connects the image capture apparatus 100 to the external apparatus 200. A cable 301 is a second transmission path that connects the image capture apparatus 100 to the external apparatus 200.

Next, components constituting the image capture apparatus 100, which can act as the image data transmitting apparatus according to the first exemplary embodiment, are described with reference to FIG. 1.

The image capture apparatus 100 includes an image capture unit 101, a memory A 102, a recording control unit 103, a display control unit 105, a display device 106, a communication unit A 107, a communication unit B 108, a user interface (UI) unit 109, and a memory B 110. Further, the image capture apparatus 100 includes a central processing unit (CPU) 111, an internal bus 112, an identification (ID) information generating unit 113, a time code (TC) information generating unit 114, and a memory C 115.

The image capture unit 101 includes a lens unit, an image sensor that obtains optical images via the lens unit at intervals of a predetermined time T1, and an image data generating unit that generates image data of one frame based on the optical image obtained by the image sensor. The image capture unit 101 generates image data of one frame based on the optical images obtained by the image sensor at intervals of the predetermined time T1. Thus, the image capture unit 101 can generate RAW image data of two or more consecutive frames. In the following description, the "RAW image data" refers to image data of one frame generated by the image capture unit 101. The lens unit can be configured to be detachable from the image capture unit 101.

The image capture unit 101 generates a plurality of RAW image data based on a predetermined frame rate FR and outputs each generated RAW image data. A user is allowed to select the predetermined frame rate FR in the range from 1 frame/sec to 120 frame/sec. For example, the user can select one of 1, 24, 25, 30, 50, 60, and 120 (frame/sec) as the predetermined frame rate FR. The predetermined time T1 can be determined based on the predetermined frame rate FR. For example, the predetermined time T1 is any one of 1/1, 1/24, 1/25, 1/30, 1/50, 1/60, and 1/120 (sec). The image size (or the resolution in the horizontal and vertical directions) of each RAW image data generated by the image capture unit 101 is any one of 4096×2160, 4096×1080, 3840×2160, 3840×1080, 2048×1080 and 1920×1080. Each RAW image data generated by the image capture unit 101 can be stored in the memory A 102.

The memory A 102 stores each RAW image data received from the image capture unit 101 together with relevant additional information. The memory A 102 has a storage area that is sufficient to store two or more RAW image data. The additional information of each RAW image data includes various types of information generated by the CPU 111, the ID information generating unit 113, and the TC information generating unit 114. The CPU 111 controls the memory A 102 in such a way as to supply each RAW image data and relevant additional information to the recording control unit 103 and the display control unit 105. Further, the CPU 111 controls the memory A 102 to supply each RAW image data and relevant additional information to at least one of the communication unit A 107 and the communication unit B 108.

When the image capture apparatus 100 is in a moving image recording state, the recording control unit 103 can act as a moving image data recording unit configured to record each RAW image data and relevant additional information supplied from the memory A 102 to the recording control unit 103, as moving image data, in the storage device 104.

Further, when the image capture apparatus 100 is in a moving image reproducing state, the recording control unit 103 can act as a moving image data reproducing unit configured to reproduce moving image data designated by a user from the storage device 104. Each RAW image data and relevant additional information included in the moving image data having been read from the storage device 104 can be supplied from the recording control unit 103 to the display control unit 105 and can be displayed on the display device 106.

The storage device 104 can act as a recording medium. The storage device 104 includes, for example, a flash memory, a memory card, or a hard disk device. The storage device 104 can be any movable storage device that is detachable from the image capture apparatus 100 or can be a built-in storage device provided in the image capture apparatus 100.

When the image capture apparatus 100 is in the moving image recording state, the display control unit 105 provides a first function of causing the display device 106 to display an image that corresponds to each RAW image data supplied from the memory A 102 to the display control unit 105.

Further, when the image capture apparatus 100 is in the moving image reproducing state, the display control unit 105 provides a second function of causing the display device 106 to display an image that corresponds to each RAW image data supplied from the recording control unit 103 to the display control unit 105. Further, the display control unit 105 can display setting menus and various types of information on the display device 106.

The display device 106 includes a liquid crystal display device. The display device 106 can be configured to be detachable from the image capture apparatus 100.

Both of the communication unit A 107 and the communication unit B 108 conform to the requirements of Serial Digital Interface (SDI) standards. For example, each of the communication unit A 107 and the communication unit B 108 conforms to the requirements of HD-SDI standards and 3G-SDI standards.

The communication unit A 107 can act as a first transmitting unit configured to transmit each RAW image data and relevant additional information supplied from the memory A 102 to the external apparatus 200 via the cable 300.

The communication unit B 108 can act as a second transmitting unit configured to transmit each RAW image data and relevant additional information supplied from the memory A 102 to the external apparatus 200 via the cable 301.

The UI unit 109 can act as an instruction input unit configured to input various user instructions to the CPU 111. The UI unit 109 includes switches, buttons, and a touch panel that enable users to input various instructions.

The UI unit 109 further includes a power switch, a mode selection switch, a start/stop button, a menu button, a cross button, a set button, a merging recording function switch, an interlock recording function switch, and a frame rate selection switch. The power switch is operable to bring the image capture apparatus 100 into the ON state or the OFF state. The mode selection switch is operable to select one of a plurality of operation modes of the image capture apparatus 100. The operation modes of the image capture apparatus 100 include, for example, a moving image shooting mode and a moving image reproduction mode. The menu button is operable to instruct a setting menu to be displayed. The cross button and the set button are operable to operate the displayed setting menu. The start/stop button is operable to instruct start or stop of a recording operation. The merging recording function switch is operable to set a merging recording function to ON or OFF. The setting information relating to the merging recording function is stored in the memory C 115. The interlock recording function switch is operable to set an interlock recording function to ON or OFF. The setting information relating to the interlock recording function is stored in the memory C 115. The frame rate selection switch is operable to select the frame rate of the image data to be output from the image capture unit 101 in the range from 1 frame/sec to 120 frame/sec.

A plurality of programs that can be executed by the CPU 111 is stored in the memory B 110. The programs stored in the memory B 110 include programs Pg1 and Pg2 that are described below.

The CPU 111 includes a processor that controls the image capture apparatus 100. The CPU 111 can control the image capture apparatus 100 using at least one of the programs stored in the memory B 110. The CPU 111 can control the image capture unit 101, the memory A 102, the recording control unit 103, the display control unit 105, the display device 106, the communication unit A 107, the communication unit B 108, the UI unit 109, and the memory B 110. Further, the CPU 111 can control the ID information generating unit 113, the TC information generating unit 114, and the memory C 115.

The ID information generating unit 113 can generate ID information. The ID information generated by the ID information generating unit 113 is information that can identify moving image data to which each of two or more RAW image data belongs, generated after the timing to instruct starting a moving image recording operation and before the timing to instruct stopping the moving image recording operation. For example, Unique Material Identifier (UMID) regulated according to the SMPTE330M standards can be used as ID information. Information other than the UMID can be used as the ID information. The CPU 111 can control the memory A 102 in such a way as to add the ID information generated by the ID information generating unit 113 to the additional information of each RAW image data generated after the timing to instruct starting a moving image recording operation and before the timing to instruct stopping the moving image recording operation.

The system described in the first exemplary embodiment is configured to generate ID information in response to a start instruction of a moving image recording operation. However, the first exemplary embodiment is not limited to the above-mentioned configuration. For example, the system can be configured to generate ID information for the next moving image data in response to a stop instruction of the moving image recording operation.

The TC information generating unit 114 generates continuous time code information, each time RAW image data is generated by the image capture unit 101, after the timing to instruct starting a moving image recording operation and until timing to instruct stopping the moving image recording operation. Each time code information generated by the TC information generating unit 114 includes a time elapsed after the timing to instruct starting the moving image recording operation and the number of frames. The time code information to be generated by the TC information generating unit 114 is, for example, configured to have a format of "hour: minute: second: frame. 0 or 1." The time code information generated after the timing to instruct starting the moving image recording operation and until timing to instruct stopping the moving image recording operation includes continuous values. The CPU 111 controls the memory A 102 in such a way as to add the time code information generated by the TC information generating unit 114 to the additional information of the RAW image data that corresponds to the time code information.

The memory C 115 stores various types of information that relate to the image capture apparatus 100. The setting information relating to the operation mode of the image capture apparatus 100 is stored in the memory C 115. The setting information relating to the interlock recording function is stored in the memory C 115.

Next, components constituting the external apparatus 200, which can act as the image data receiving apparatus according to the first exemplary embodiment, are described in detail below with reference to FIG. 1.

The external apparatus 200 includes a communication unit A 201, a communication unit B 202, a memory A 203, a recording control unit 204, a display control unit 206, a display device 207, and a user interface (UI) unit 208. Further, the external apparatus 200 includes a memory C 209, a central processing unit (CPU) 210, an internal bus 211, and a memory D 212.

Both of the communication unit A 201 and the communication unit B 202 conform to the requirements of Serial Digital Interface (SDI) standards. For example, each of the communication unit A 201 and the communication unit B 202 conforms to the requirements of HD-SDI standards and 3G-SDI standards.

The communication unit A 201 can act as a first receiving unit configured to receive each RAW image data together with relevant additional information from the communication unit A 107 via the cable 300. The RAW image data and relevant additional information received by the communication unit A 201 can be stored in the memory A 203.

The communication unit B 202 can act as a second receiving unit configured to receive each RAW image data together with relevant additional information from the communication unit B 108 of the image capture apparatus 100 via the cable 301. The RAW image data and relevant additional information received by the communication unit B 202 can be stored in the memory A 203.

The memory A 203 stores each RAW image data and relevant additional information supplied from the communication unit A 201. Further, the memory A 203 stores each RAW image data and relevant additional information supplied from the communication unit B 202. The memory A 203 includes a storage area that is sufficient to store two or more RAW image data and relevant additional information.

The RAW image data and relevant additional information stored in the memory A 203 can be supplied from the memory A 203 to each of the recording control unit 204 and the display control unit 206.

When the external apparatus 200 is in the moving image recording state, the recording control unit 204 can act as a moving image data recording unit configured to record each RAW image data and relevant additional information, when they are supplied from the memory A 203 to the recording control unit 204, as moving image data in the storage device 205.

Further, when the external apparatus 200 is in the moving image reproducing state, the recording control unit 204 can act as a moving image data reproducing unit configured to reproduce moving image data designated by a user from the storage device 205. Each RAW image data and relevant additional information included in the moving image data having been read from the storage device 205 can be supplied from the recording control unit 204 to the display control unit 206 and can be displayed on the display device 207.

The storage device 205 can act as a recording medium. The storage device 205 includes, for example, a flash memory, a memory card, or a hard disk device. The storage device 205 can be any movable storage device that is detachable from the external apparatus 200 or can be a built-in storage device provided in the external apparatus 200.

When the external apparatus 200 is in the moving image recording state, the display control unit 206 provides a first function of causing the display device 207 to display an image that corresponds to each RAW image data supplied from the memory A 203 to the display control unit 206.

Further, when the external apparatus 200 is in the moving image reproducing state, the display control unit 206 provides a second function of causing the display device 207 to display an image that corresponds to each RAW image data supplied from the recording control unit 204 to the display control unit 206. Further, the display control unit 206 can display setting menus and various types of information on the display device 207.

The display device 207 includes a liquid crystal display device. The display device 207 can be configured to be detachable from the external apparatus 200.

The UI unit 208 can act as an instruction input unit configured to input various user instructions to the CPU 210. The UI unit 208 includes switches, buttons, and a touch panel that enable users to input various instructions.

The UI unit 208 further includes a power switch, a mode selection switch, a start/stop button, a menu button, a cross button, a set button, and a merging recording function switch. The power switch is operable to bring the external apparatus 200 into the ON state or the OFF state. The mode selection switch is operable to select one of a plurality of operation modes of the external apparatus 200. The operation modes of the external apparatus 200 includes, for example, a moving image recording mode, a moving image reproduction mode, and a moving image data merging mode. The menu button is operable to instruct a setting menu to be displayed. The cross button and the set button are operable to operate displayed setting menu. The start/stop button is operable to instruct start or stop of a recording operation. The merging recording function switch is operable to set the merging recording function to ON or OFF.

A plurality of programs that can be executed by the CPU 210 is stored in the memory C 209. The programs stored in the memory C 209 include programs Pg3 and Pg4 that are described below.

The CPU 210 includes a processor that controls the external apparatus 200 using the plurality of programs stored in the memory C 209. The CPU 210 can control the external apparatus 200 using at least one of the programs stored in the memory C 209.

The CPU 210 can control the communication unit A 201, the communication unit B 202, the memory A 203, the recording control unit 204, the display control unit 206, the display device 207, the UI unit 208, the memory C 209, and the memory D 212.

The memory D 212 stores various types of information that relate to the external apparatus 200. The setting information relating to the operation mode of the external apparatus 200 is stored in the memory D 212. The setting information relating to the merging recording function is stored in the memory D 212.

Figure 2:
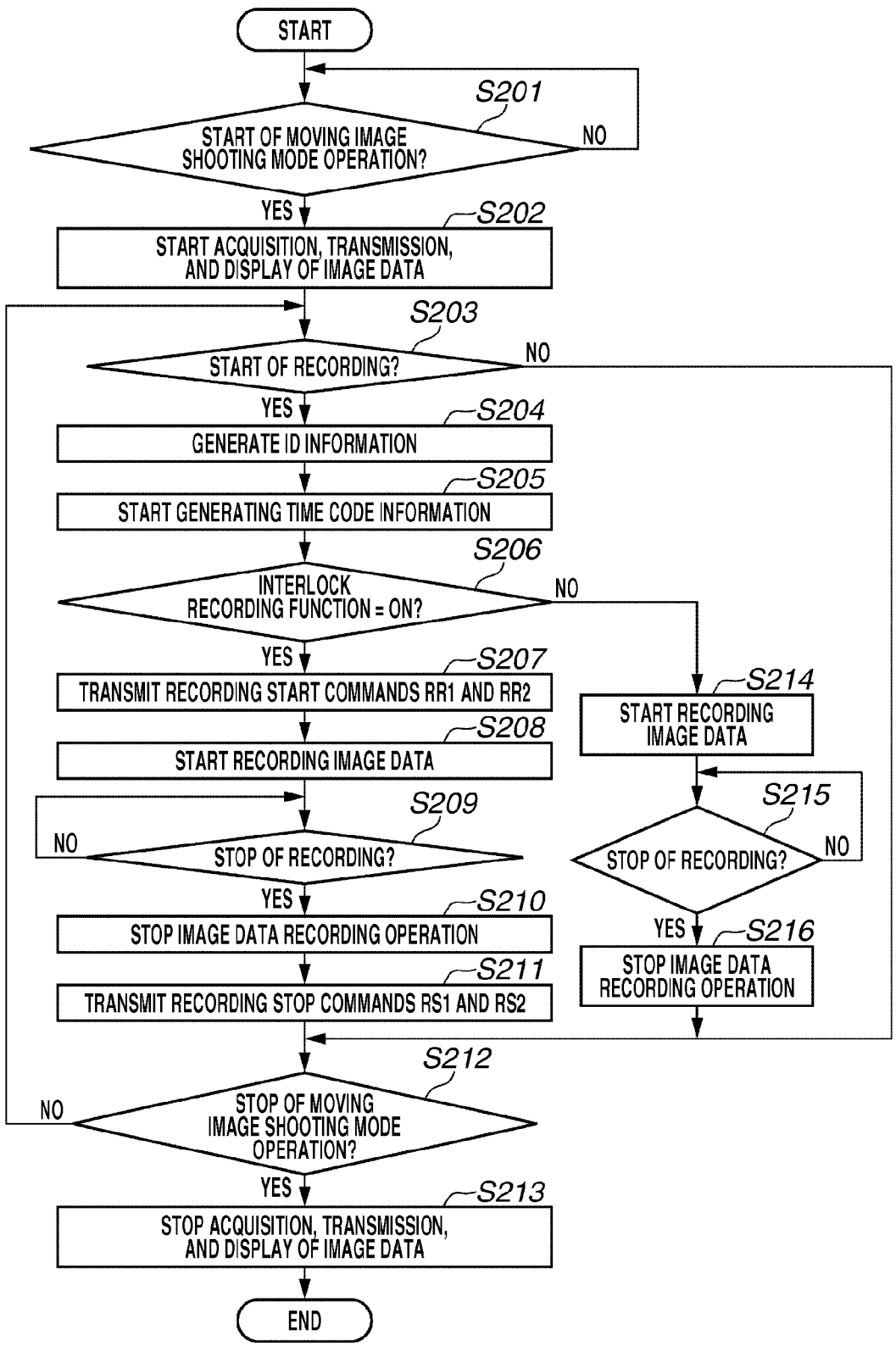
FIG. 2 is a flowchart illustrating moving image capturing process A1 that can be performed by an image data transmitting apparatus according to the first exemplary embodiment.

Next, moving image capturing process A1 that can be performed by the image capture apparatus 100 according to the first exemplary embodiment is described below with reference to FIG. 2. FIG. 2 is a flowchart illustrating the moving image capturing process A1 that can be performed by the image capture apparatus 100 according to the first exemplary embodiment. To realize the moving image capturing process A1, the CPU 111 executes the program Pg1 that can be loaded from the memory B 110.

In step S201, the CPU 111 determines whether starting an operation in the moving image shooting mode has been instructed. The moving image shooting mode is one of the operation modes provided beforehand for the image capture apparatus 100.

For example, when the power switch is ON, if the mode selection switch is operated to select the moving image shooting mode, the CPU 111 determines that starting the moving image shooting mode operation has been instructed. If the instruction of starting the moving image shooting mode operation has been confirmed (YES in step S201), the operation of the CPU 111 proceeds from step S201 to step S202.

For example, if the mode selection switch is not operated to select the moving image shooting mode even when the power switch is ON, the CPU 111 determines that starting the moving image shooting mode operation has not been instructed. If the instruction of starting the moving image shooting mode operation has not been confirmed (NO in step S201), the CPU 111 repeats the above-mentioned process in step S201.

In step S202, the CPU 111 transmits an acquisition start command to the image capture unit 101. In response to the acquisition start command, the image capture unit 101 initiates a process for acquiring optical images via the image sensor at intervals of predetermined time T1. Then, the image capture unit 101 generates a plurality of RAW image data at the predetermined frame rate FR and outputs each generated RAW image data. A user can select the predetermined frame rate FR in the range from 1 frame/sec to 120 frame/sec. Each RAW image data generated by the image capture unit 101 is stored together with relevant additional information in the memory A 102.

Further, in step S202, the CPU 111 transmits a transmission start command to each of the communication unit A 107 and the communication unit B 108. Further, the CPU 111 initiates a process for controlling the memory A 102 in such a way as to supply each RAW image data and relevant additional information from the memory A 102 to at least one of the communication unit A 107 and the communication unit B 108. In response to the transmission start command, the communication unit A 107 initiates a process for transmitting each RAW image data and relevant additional information (i.e., the data/information supplied from the memory A 102 to the communication unit A 107) to the external apparatus 200 via the cable 300. In response to the transmission start command, the communication unit B 108 initiates a process for transmitting each RAW image data and relevant additional information (i.e., the data/information supplied from the memory A 102 to the communication unit A 107) to the external apparatus 200 via the cable 301.

Further, in step S202, the CPU 111 transmits a display start command to the display control unit 105. Further, the CPU 111 initiates a process for controlling the memory A 102 in such a way as to supply each RAW image data and relevant additional information from the memory A 102 to the display control unit 105. In response to the display start command, the display control unit 105 initiates a process for controlling the display device 106 in such a way that an image that corresponds to each RAW image data supplied from the memory A 102 to the display control unit 105 can be displayed on the display device 106.

The operation of the CPU 111 proceeds from step S202 to step S203 after completing the transmission of the acquisition start command to the image capture unit 101, the transmission of the transmission start command to each of the communication unit A 107 and the communication unit B 108, and the transmission of the display start command to the display control unit 105.

In step S203, the CPU 111 determines whether starting a moving image recording operation has been instructed.

For example, if the start/stop button is ON when the power switch is ON and the operation mode currently selected via the mode selection switch is the moving image shooting mode, the CPU 111 determines that starting the moving image recording operation has been instructed. If the instruction of starting the moving image recording operation has been confirmed (YES in step S203), the operation of the CPU 111 proceeds from step S203 to step S204. In this case, the image capture apparatus 100 is brought into the moving image recording state.

For example, if the start/stop button is not turned on when the power switch is ON and the operation mode currently selected via the mode selection switch is the moving image shooting mode, the CPU 111 determines that starting the moving image recording operation has not been instructed. If the instruction of starting a moving image recording operation has not been confirmed (NO in step S203), the operation of the CPU 111 proceeds from step S203 to step S212.

In step S204, the CPU 111 transmits an ID information generation command to the ID information generating unit 113. In response to the ID information generation command, the ID information generating unit 113 generates single ID information. The CPU 111 initiates a process for controlling the memory A 102 in such a way as to add the ID information generated by the ID information generating unit 113 to the additional information of each RAW image data generated after the timing to instruct starting the moving image recording operation and until timing to instruct stopping the moving image recording operation.

The operation of the CPU 111 proceeds from step S204 to step S205 after completing the transmission of the ID information generation command to the ID information generating unit 113.

In step S205, the CPU 111 transmits a TC information generation command to the TC information generating unit 114. In response to the TC information generation command, the TC information generating unit 114 generates time code information each time when the image capture unit 101 generates RAW image data after the timing to instruct starting the moving image recording operation and until timing to instruct stopping the moving image recording operation. The time code information generated after the timing to instruct starting the moving image recording operation and until timing to instruct stopping the moving image recording operation includes continuous values. The CPU 111 initiates a process for controlling the memory A 102 in such a way as to add the time code information generated by the TC information generating unit 114 to the additional information of RAW image data that corresponds to the time code information.

The operation of the CPU 111 proceeds from step S205 to step S206 upon completing the transmission of the TC information generation command to the TC information generating unit 114.

In step S206, the CPU 111 determines whether the interlock recording function is ON. The setting information relating to the interlock recording function is stored in the memory C 115. The interlock recording function is a function of instructing the external apparatus 200 to start/stop a moving image recording operation when a user inputs an instruction to start/stop a moving image recording operation to the image capture apparatus 100. If the interlock recording function is ON, the external apparatus 200 can record moving image data, which is identical to the moving image data that the image capture apparatus 100 can record in the storage device 104, in the storage device 205.

For example, when the setting information relating to the interlock recording function indicates ON, the CPU 111 determines that the interlock recording function is ON. If the interlock recording function is ON (YES in step S206), the operation of the CPU 111 proceeds from step S206 to step S207.

For example, when the setting information relating to the interlock recording function indicates OFF, the CPU 111 determines that the interlock recording function is OFF. If the interlock recording function is OFF (NO in step S206), the operation of the CPU 111 proceeds from step S206 to step S214.

In step S207, the CPU 111 transmits a recording start command transmission instruction to each of the communication unit A 107 and the communication unit B 108.

In response to the recording start command transmission instruction, the communication unit A 107 transmits a recording start command RR1 to the external apparatus 200 via the cable 300. The recording start command RR1 is a command to instruct the external apparatus 200 to start recording RAW image data transmitted to the external apparatus 200 via the cable 300.

In response to the recording start command transmission instruction, the communication unit B 108 transmits a recording start command RR2 to the external apparatus 200 via the cable 301. The recording start command RR2 is a command to instruct the external apparatus 200 to start recording RAW image data transmitted to the external apparatus 200 via the cable 301.

The operation of the CPU 111 proceeds from step S207 to step S208 after completing the transmission of the recording start command transmission instruction to each of the communication unit A 107 and the communication unit B 108.

In step S208, the CPU 111 transmits the recording start command to the recording control unit 103. Further, the CPU 111 initiates a process for controlling the memory A 102 in such a way as to supply each RAW image data and relevant additional information from the memory A 102 to the recording control unit 103. In response to the recording start command, the recording control unit 103 initiates a process for recording the RAW image data and relevant additional information supplied from the memory A 102 to the recording control unit 103, as moving image data, in the storage device 104. The additional information supplied from the memory A 102 to the recording control unit 103 includes the above-mentioned ID information and time code information.

The operation of the CPU 111 proceeds from step S208 to step S209 after completing the transmission of the recording start command to the recording control unit 103.

In step S209, the CPU 111 determines whether stopping the moving image recording operation has been instructed.

For example, when either one of the power switch and the start/stop button is OFF, the CPU 111 determines that stopping the moving image recording operation has been instructed. Further, for example, when the operation mode currently selected via the mode selection switch is not the moving image shooting mode, the CPU 111 determines that stopping the moving image recording operation has been instructed. If the instruction of stopping the moving image recording operation has been confirmed (YES in step S209), the operation of the CPU 111 proceeds from step S209 to step S210. In this case, the image capture apparatus 100 is brought into a recording stop state.

For example, when each of the power switch and the start/stop button is ON and the operation mode currently selected via the mode selection switch is the moving image shooting mode, the CPU 111 determines that stopping the moving image recording operation has not been instructed. If the instruction of stopping the moving image recording operation has not been confirmed (NO in step S209), the CPU 111 repeats the above-mentioned process in step S209.

In step S210, the CPU 111 transmits a recording stop command to the recording control unit 103. In response to the recording stop command, the recording control unit 103 stops the process for recording the RAW image data and relevant additional information supplied from the memory A 102 to the recording control unit 103, as moving image data, in the storage device 104.

The operation of the CPU 111 proceeds from step S210 to step S211 after completing the transmission of the recording stop command to the recording control unit 103.

In step S211, the CPU 111 transmits a recording stop command transmission instruction to each of the communication unit A 107 and the communication unit B 108.

In response to the recording stop command transmission instruction, the communication unit A 107 transmits a recording stop command RS1 to the external apparatus 200 via the cable 300. The recording stop command RS1 is a command to instruct the external apparatus 200 to stop the recording of RAW image data transmitted to the external apparatus 200 via the cable 300.

In response to the recording stop command transmission instruction, the communication unit B 108 transmits a recording stop command RS2 to the external apparatus 200 via the cable 301. The recording stop command RS2 is a command to instruct the external apparatus 200 to stop the recording of RAW image data transmitted to the external apparatus 200 via the cable 301.

The operation of the CPU 111 proceeds from step S211 to step S212 after completing the transmission of the recording stop command transmission instruction to each of the communication unit A 107 and the communication unit B 108.

In step S212, the CPU 111 determines whether stopping the moving image shooting mode operation has been instructed.

For example, when the power switch is ON and the operation mode currently selected via the mode selection switch is not the moving image shooting mode, the CPU 111 determines that stopping the moving image shooting mode operation has been instructed. Further, for example, when the power switch is OFF, the CPU 111 determines that stopping the moving image shooting mode operation has been instructed. If the instruction of stopping the moving image shooting mode operation has been confirmed (YES in step S212), the operation of the CPU 111 proceeds from step S212 to step S213.

For example, when the power switch is ON and the operation mode currently selected via the mode selection switch is the moving image shooting mode, the CPU 111 determines that stopping the moving image shooting mode operation has not been instructed. If the instruction of stopping the moving image shooting mode operation has not been confirmed (NO in step S212), the operation of the CPU 111 returns from step S212 to step S203.

In step S213, the CPU 111 transmits a transmission stop command to each of the communication unit A 107 and the communication unit B 108. Further, the CPU 111 stops the process for causing the memory A 102 to supply each RAW image data and relevant additional information from the memory A 102 to at least one of the communication unit A 107 and the communication unit B 108. In response to the transmission stop command, the communication unit A 107 stops the process for transmitting each RAW image data and relevant additional information supplied from the memory A 102 to the external apparatus 200 via the cable 300. In response to the transmission stop command, the communication unit B 108 stops the process for transmitting each RAW image data and relevant additional information supplied from the memory A 102 to the external apparatus 200 via the cable 301.

Further, in step S213, the CPU 111 transmits a display stop command to the display control unit 105. Further, the CPU 111 stops the process for causing the memory A 102 to supply each RAW image data and relevant additional information from the memory A 102 to the display control unit 105. In response to the display stop command, the display control unit 105 stops the process for causing the display device 106 to display an image that corresponds to each RAW image data supplied from the memory A 102 to the display control unit 105.

Further, in step S213, the CPU 111 transmits an acquisition stop command to the image capture unit 101. In response to the acquisition stop command, the image capture unit 101 stops the process for acquiring optical images via the image sensor at intervals of predetermined time T1.

If the transmission of the transmission stop command to each of the communication unit A 107 and the communication unit B 108, the transmission of the display stop command to the display control unit 105, and the transmission of the acquisition stop command to the image capture unit 101 are all completed, the CPU 111 terminates the moving image capturing process A1.

In step S214, the CPU 111 transmits a recording start command to the recording control unit 103. Further, the CPU 111 initiates a process for controlling the memory A 102 in such a way as to supply each RAW image data and relevant additional information from the memory A 102 to the recording control unit 103. In response to the recording start command, the recording control unit 103 initiates a process for recording each RAW image data and relevant additional information supplied from the memory A 102 to the recording control unit 103, as moving image data, in the storage device 104. The additional information supplied from the memory A 102 to the recording control unit 103 includes the above-mentioned ID information and time code information.

The operation of the CPU 111 proceeds from step S214 to step S215 after completing the transmission of the recording start command to the recording control unit 103.

In step S215, the CPU 111 determines whether stopping the moving image recording operation has been instructed.

For example, when at least one of the power switch and the start/stop button is OFF, the CPU 111 determines that stopping the moving image recording operation has been instructed. Further, for example, when the operation mode currently selected via the mode selection switch is not the moving image shooting mode, the CPU 111 determines that stopping the moving image recording operation has been instructed. If the instruction of stopping the moving image recording operation has been confirmed (YES in step S215), the operation of the CPU 111 proceeds from step S215 to step S216. The image capture apparatus 100 is brought into the recording stop state.

For example, when each of the power switch and the start/stop button is ON and the operation mode currently selected via the mode selection switch is the moving image shooting mode, the CPU 111 determines that stopping the moving image recording operation has not been instructed. If the instruction of stopping the moving image recording operation has not been confirmed (NO in step S215), the CPU 111 repeats the above-mentioned process in step S215.

In step S216, the CPU 111 transmits a recording stop command to the recording control unit 103. In response to the recording stop command, the recording control unit 103 stops the process for recording each RAW image data and relevant additional information supplied from the memory A 102 to the recording control unit 103, as moving image data, in the storage device 104.

The operation of the CPU 111 proceeds from step S216 to step S212 after completing the transmission of the recording stop command to the recording control unit 103.

Figure 3:
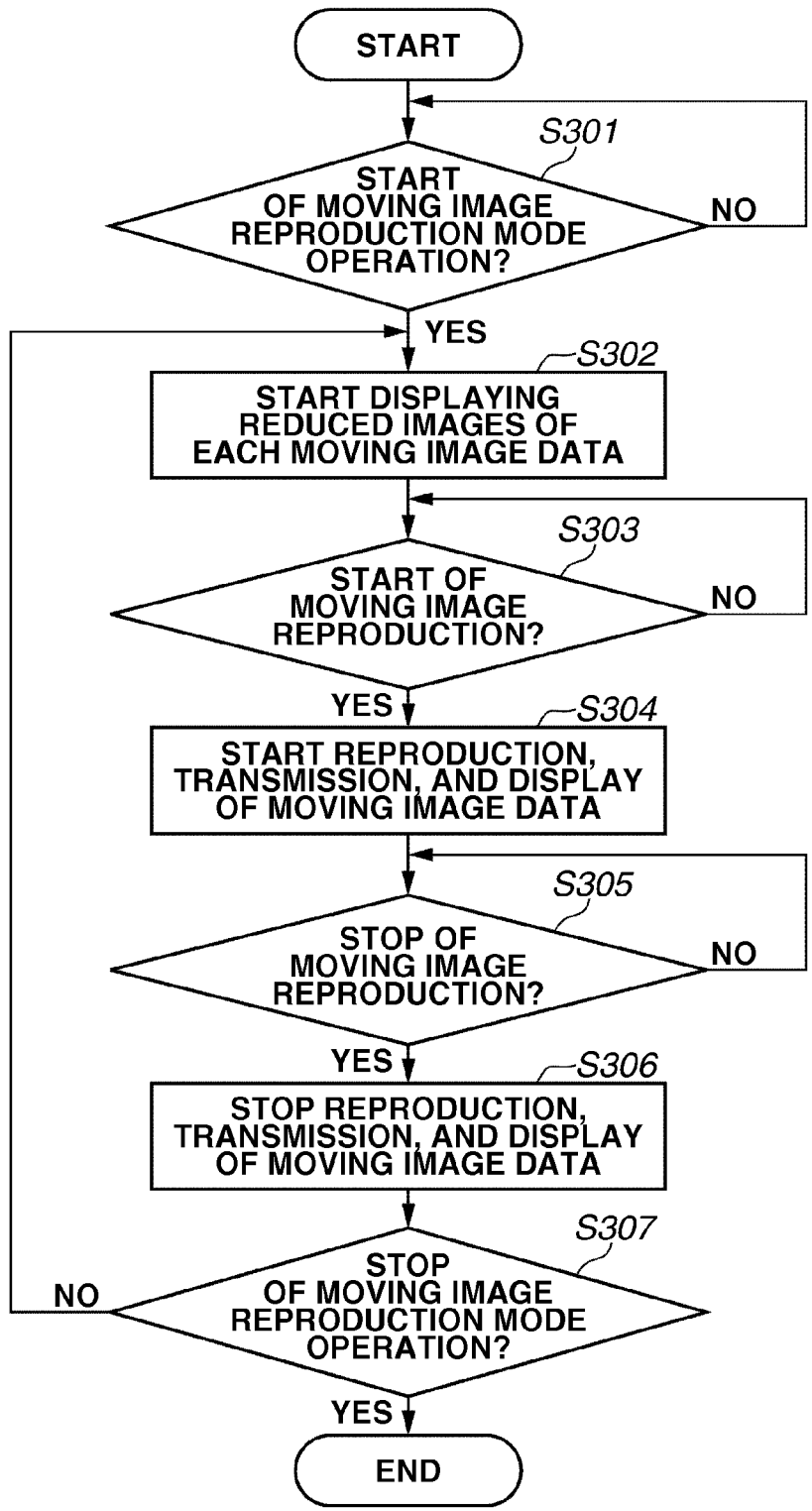
FIG. 3 is a flowchart illustrating moving image reproduction process B1 that can be performed by the image data transmitting apparatus according to the first exemplary embodiment.

Next, moving image reproduction process B1 that can be performed by the image capture apparatus 100 according to the first exemplary embodiment is described below with reference to FIG. 3. FIG. 3 is a flowchart illustrating the moving image reproduction process B1 that can be performed by the image capture apparatus 100 according to the first exemplary embodiment. To realize the moving image reproduction process B1, the CPU 111 executes the program Pg2 that can be loaded from the memory B 110.

In step S301, the CPU 111 determines whether starting an operation in the moving image reproduction mode has been instructed. The moving image reproduction mode is one of the operation modes provided beforehand for the image capture apparatus 100.

For example, when the power switch is ON, if the mode selection switch is operated to select the moving image reproduction mode, the CPU 111 determines that starting the moving image reproduction mode operation has been instructed. If the instruction of starting the moving image reproduction mode operation has been confirmed (YES in step S301), the operation of the CPU 111 proceeds from step S301 to step S302.

For example, if the mode selection switch is not operated to select the moving image reproduction mode even when the power switch is ON, the CPU 111 determines that starting the moving image reproduction mode operation has not been instructed. If the instruction of starting the moving image reproduction mode operation has not been confirmed (NO in step S301), the CPU 111 repeats the above-mentioned process in step S301.

In step S302, the CPU 111 transmits an index display start command to the display control unit 105. In response to the index display start command, the display control unit 105 initiates a process for controlling the display device 106 in such a way that a reduced image (e.g., a representative image or a thumbnail image) that corresponds to each moving image data recorded in the storage device 104 can be displayed on the display device 106. For example, the display control unit 105 controls the display device 106 in such a way as to simultaneously display four, six, or eight reduced images. Further, for example, the display control unit 105 controls the display device 106 in such a way as to realize a scroll display for each group of four, six, or eight reduced images that correspond to each moving image data. A user can operate the cross button to select an intended reduced image of the moving image data to be reproduced.

The operation of the CPU 111 proceeds from step S302 to step S303 after completing the transmission of the index display start command to the display control unit 105.

In step S303, the CPU 111 determines whether starting the moving image reproduction process has been instructed in a state where a single reduced image is selected.

For example, if the start/stop button is pressed in the state where the single reduced image is selected, the CPU 111 determines that starting the moving image reproduction process has been instructed. If the instruction of the starting the moving image reproduction process has been confirmed (YES in step S303), the operation of the CPU 111 proceeds from step S303 to step S304. In this case, the image capture apparatus 100 is brought into the moving image reproducing state.

For example, if the start/stop button has not been pressed in a state where the single reduced image is selected, the CPU 111 determines that starting the moving image reproduction process has not been instructed. If the instruction of starting the moving image reproduction process has not been confirmed (NO in step S303), the CPU 111 repeats the above-mentioned process in step S303.

In step S304, the CPU 111 transmits a reproduction start command to the recording control unit 103. The reproduction start command includes information indicating moving image data that corresponds to a reduced image selected by a user when starting the moving image reproduction process has been instructed. In response to the reproduction start command, the recording control unit 103 initiates a process for reproducing moving image data designated by the reproduction start command from the storage device 104. The recording control unit 103 initiates a process for supplying each RAW image data and relevant additional information included in the moving image data reproduced from the storage device 104 to the display control unit 105. Further, the recording control unit 103 initiates a process for supplying each RAW image data and relevant additional information included in the moving image data reproduced from the storage device 104 to at least one of the communication unit A 107 and the communication unit B 108.

Further, in step S304, the CPU 111 transmits a transmission start command to each of the communication unit A 107 and the communication unit B 108. In response to the transmission start command, the communication unit A 107 initiates a process for transmitting each RAW image data and relevant additional information supplied from the recording control unit 103 to the external apparatus 200 via the cable 300. In response to the transmission start command, the communication unit B 108 initiates a process for transmitting each RAW image data and relevant additional information supplied from the recording control unit 103 to the external apparatus 200 via the cable 301.

Further, in step S304, the CPU 111 transmits a display start command to the display control unit 105. In response to the display start command, the display control unit 105 initiates a process for controlling the display device 106 in such away that an image that corresponds to each RAW image data supplied from the recording control unit 103 to the display control unit 105 can be displayed on the display device 106.

If the transmission of the reproduction start command to the recording control unit 103, the transmission of the transmission start command to each of the communication unit A 107 and the communication unit B 108, the transmission of the display start command to the display control unit 105 have been completed, the operation of the CPU 111 proceeds from step S304 to step S305.

In step S305, the CPU 111 determines whether stopping the moving image reproduction process has been instructed.

For example, when either the power switch or the start/stop button is OFF, the CPU 111 determines that stopping the moving image reproduction process has been instructed. Further, for example, when the operation mode currently selected via the mode selection switch is not the moving image reproduction mode, the CPU 111 determines that stopping the moving image reproduction process has been instructed. If the instruction of stopping the moving image reproduction process has been confirmed (YES in step S305), the operation of the CPU 111 proceeds from step S305 to step S306. The image capture apparatus 100 is bought into a reproduction stop state.

For example, when each of the power switch and the start/stop button is ON and the operation mode currently selected via the mode selection switch is the moving image reproduction mode, the CPU 111 determines that stopping the moving image reproduction process has not been instructed. If the instruction of stopping the moving image reproduction process has not been confirmed (NO in step S305), the CPU 111 repeats the above-mentioned process in step S305.

In step S306, the CPU 111 transmits a reproduction stop command to the recording control unit 103. In response to the reproduction stop command, the recording control unit 103 stops the process for reproducing moving image data from the storage device 104.

Further, in step S306, the CPU 111 transmits a transmission stop command to each of the communication unit A 107 and the communication unit B 108. In response to the transmission stop command, the communication unit A 107 stops the process for transmitting each RAW image data and relevant additional information supplied from the recording control unit 103 to the external apparatus 200 via the cable 300. In response to the transmission stop command, the communication unit B 108 stops the process for transmitting each RAW image data and relevant additional information supplied from the recording control unit 103 to the external apparatus 200 via the cable 301.

Further, in step S306, the CPU 111 transmits a display stop command to the display control unit 105. In response to the display stop command, the display control unit 105 stops the process for causing the display device 106 to display the image that corresponds to each RAW image data supplied from the recording control unit 103 to the display control unit 105.

If the transmission of the reproduction stop command to the recording control unit 103, the transmission of the transmission stop command to each of the communication unit A 107 and the communication unit B 108, and the transmission of the display stop command to the recording control unit 103 have been completed, the operation of the CPU 111 proceeds from step S306 to step S307.

In step S307, the CPU 111 determines whether stopping the moving image reproduction mode operation has been instructed.

For example, when the power switch is ON and the operation mode currently selected via the mode selection switch is not the moving image reproduction mode, the CPU 111 determines that stopping the moving image reproduction mode operation has been instructed. Further, for example, when the power switch is OFF, the CPU 111 determines that stopping the moving image reproduction mode operation has been instructed. If the instruction of stopping the moving image reproduction mode operation has been confirmed (YES in step S307), the CPU 111 terminates the moving image reproduction process B1.

For example, when the power switch is ON and the operation mode currently selected via the mode selection switch is the moving image reproduction mode, the CPU 111 determines that stopping the moving image reproduction mode operation has not been instructed. If the instruction of stopping the moving image reproduction mode operation has not been confirmed (NO in step S307), the operation of the CPU 111 returns from step S307 to step S302.

Figure 4:
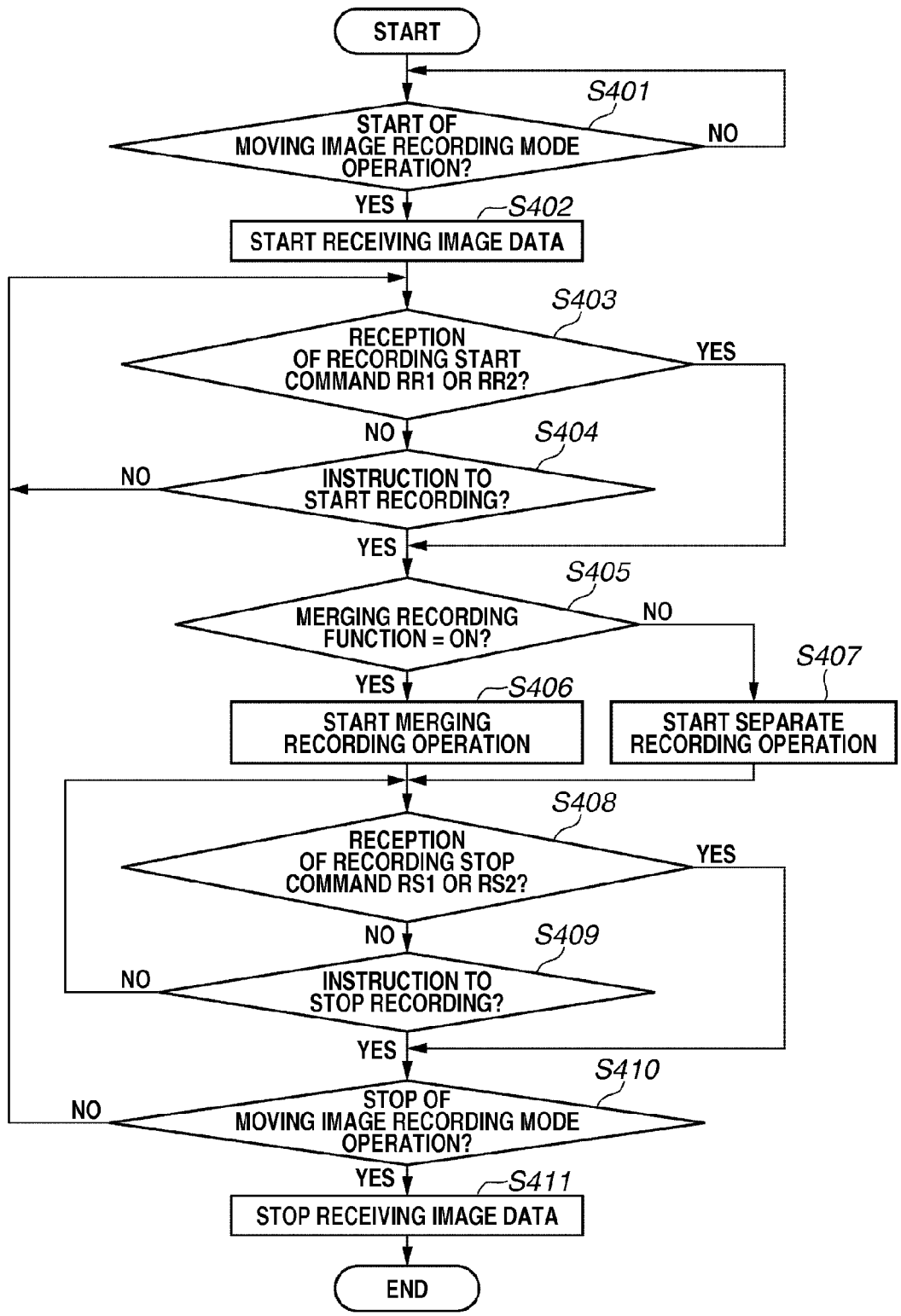
FIG. 4 is a flowchart illustrating moving image recording process C1 that can be performed by an image data receiving apparatus according to the first exemplary embodiment.

Next, moving image recording process C1 that can be performed by the external apparatus 200 according to the first exemplary embodiment is described in detail below with reference to FIG. 4. FIG. 4 is a flowchart illustrating the moving image recording process C1 that can be performed by the external apparatus 200 according to the first exemplary embodiment. To realize the moving image recording process C1, the CPU 210 executes the program Pg3 that can be loaded from the memory C 209.

In step S401, the CPU 201 determines whether starting an operation in the moving image recording mode has been instructed. The moving image recording mode is one of the operation modes provided beforehand for the external apparatus 200.

For example, when the power switch is ON and the operation mode currently selected via the mode selection switch is the moving image recording mode, the CPU 201 determines that starting the moving image recording mode operation has been instructed. If the instruction of starting the moving image recording mode operation has been confirmed (YES in step S401), the operation of the CPU 201 proceeds from step S401 to step S402.

For example, if the operation mode currently selected via the mode selection switch is not the moving image recording mode even when the power switch is ON, the CPU 201 determines that starting the moving image recording mode operation has not been instructed. If the instruction of starting the moving image recording mode operation has not been instructed (NO in step S401), the CPU 201 repeats the above-mentioned process in step S401.

In step S402, the CPU 210 transmits a reception start command to each of the communication unit A 201 and the communication unit B 202.

In response to the reception start command, the communication unit A 201 initiates a process for receiving each RAW image data and relevant additional information from the communication unit A 107 via the cable 300. The RAW image data and relevant additional information received via the communication unit A 201 can be stored as moving image data mv1 in the memory A 203.

In response to the reception start command, the communication unit B 202 initiates a process for receiving each RAW image data and relevant additional information from the communication unit B 108 via the cable 301. The RAW image data and relevant additional information received via the communication unit B 202 can be stored as moving image data mv2 in a memory B 213.

The operation of the CPU 210 proceeds from step S402 to step S403 after completing the transmission of the reception start command to each of the communication unit A 201 and the communication unit B 202.

In step S403, the CPU 210 determines whether at least one of the recording start command RR1 and the recording start command RR2 has been received. The recording start command RR1 reception result can be notified from the communication unit A 201 to the CPU 210. The recording start command RR2 reception result can be notified from the communication unit B 202 to the CPU 210.

If at least one of the recording start command RR1 and the recording start command RR2 has been received (YES in step S403), the operation of the CPU 210 proceeds from step S403 to step S405. In this case, the external apparatus 200 is brought into the moving image recording state. The operation to be performed by the CPU 210 in the first exemplary embodiment is not limited to the above-mentioned example. For example, the configuration of the external apparatus 200 is changeable in such a way as to proceed from step S403 to step S404 when both of the recording start command RR1 and the recording start command RR2 have been received.

If both of the recording start command RR1 and the recording start command RR2 have not been received (NO in step S403), the operation of the CPU 210 proceeds from step S403 to step S404.

In step S404, the CPU 210 determines whether starting a moving image recording operation has been instructed.

For example, if the start/stop button is turned on when the power switch is ON and the operation mode currently selected via the mode selection switch is the moving image recording mode, the CPU 210 determines that starting the moving image recording operation has been instructed. If the instruction of starting the moving image recording operation has been confirmed (YES in step S404), the operation of the CPU 210 proceeds from step S404 to step S405. In this case, the external apparatus 200 is brought into the moving image recording state.

For example, if the start/stop button is not turned on when the power switch is ON and the operation mode currently selected via the mode selection switch is the moving image recording mode, the CPU 210 determines that starting the moving image recording operation has not been instructed. If the instruction of starting the moving image recording operation has not been confirmed (NO in step S404), the operation of the CPU 210 returns from step S404 to step S403.

In step S405, the CPU 210 determines whether the merging recording function is ON. The setting information relating to the merging recording function is stored in the memory D 212.

For example, if the setting information relating to the merging recording function is ON, the CPU 210 determines that the merging recording function is ON. If the merging recording function is ON (YES in step S405), the operation of the CPU 210 proceeds from step S405 to step S406.

For example, when the setting information relating to the merging recording function is OFF, the CPU 210 determines that the merging recording function is OFF. If the merging recording function is OFF (NO in step S405), the operation of the CPU 210 proceeds from step S405 to step S407.

In step S406, the CPU 210 transmits a merging recording command to the recording control unit 204. Further, the CPU 210 initiates a process for controlling the memory A 203 in such a manner that the moving image data mv1 can be supplied from the memory A 203 to the recording control unit 204. Further, the CPU 210 initiates a process for controlling the memory B 213 in such a manner that the moving image data mv2 can be supplied from the memory B 213 to the recording control unit 204.

In response to the merging recording command, the recording control unit 204 initiates a process for sorting each RAW image data included in the moving image data mv1 and each RAW image data included in the moving image data mv2 according to their time code information and merging the moving image data mv1 and the moving image data mv2 into a single moving image data. For example, if the frame rate of the moving image data mv1 and mv2 is 30 frame/sec, the frame rate of the merged moving image data is 60 frame/sec. Then, the recording control unit 204 records the merged moving image data in the storage device 205. However, if the merged moving image data includes a plurality of RAW image data having the same time code information, the recording control unit 204 records only one RAW image data in the storage device 205. Thus, it is feasible to prevent the same RAW image data from being repetitively recorded in the storage device 205. For example, the recording control unit 204 can determine the RAW image data to be recorded in the storage device 205 with reference to recording designation information described below when the merged moving image data includes two or more RAW image data that have the same time code information. The original moving image data can be reconstructed if the continuity is confirmed in the time code information when all of the RAW image data included in the moving image data mv1 and all of the RAW image data included in the moving image data mv2 are sorted according to their time code information.

In step S406, if a portion where the time code information is not continuous is detected, the recording control unit 204 can divide the merged moving image data at the detected portion. Further, in step S406, if different ID information is detected, the recording control unit 204 can divide the merged moving image data.

Further, in step S406, the recording control unit 204 can record only a limited portion of the merged moving image data where the time code information is continuous, as a single or a plurality of moving image data, in the storage device 205. Further, in step S406, the recording control unit 204 can record only a limited portion of the merged moving image data where the ID information is identical, as a single or a plurality of moving image data, in the storage device 205.

The operation of the CPU 201 proceeds from step S406 to step S408 after completing the transmission of the merging recording command to the recording control unit 204.

In step S407, the CPU 210 transmits a separate recording command to the recording control unit 204. Further, the CPU 210 initiates a process for controlling the memory A 203 in such away that the moving image data mv1 can be supplied from the memory A 203 to the recording control unit 204. Further, the CPU 210 initiates a process for controlling the memory B 213 in such a way that the moving image data mv2 can be supplied from the memory B 213 to the recording control unit 204.

In response to the separate recording command, the recording control unit 204 initiates a process for recording the moving image data mv1 in the storage device 205 and a process for recording the moving image data mv2 in the storage device 205. Thus, the moving image data mv1 and the moving image data mv2 are stored, as different moving image data, in the storage device 205.

The operation of the CPU 210 proceeds from step S407 to step S408 after completing the transmission of the separate recording command to the recording control unit 204.

In step S408, the CPU 210 determines whether at least one of the recording stop command RS1 and the recording stop command RS2 has been received. The recording stop command RS1 reception result can be notified from the communication unit A 201 to the CPU 210. The recording stop command RS2 reception result can be notified from the communication unit B 202 to the CPU 210.

If at least one of the recording stop command RS1 and the recording stop command RS2 has been received (YES in step S408), the operation of the CPU 210 proceeds from step S408 to step S410. In this case, the external apparatus 200 is brought into the recording stop state. The operation to be performed by the CPU 210 in the first exemplary embodiment is not limited to the above-mentioned example. For example, the configuration of the external apparatus 200 is changeable in such a way as to proceed from step S408 to step S410 when both of the recording stop command RS1 and the recording stop command RS2 have been received If both the recording stop command RS1 and the recording stop command RS2 have not been received (NO in step S408), the operation of the CPU 210 proceeds from step S408 to step S409.

In step S409, the CPU 210 determines whether stopping the moving image recording operation has been instructed.

For example, when either the power switch or the start/stop button is OFF, the CPU 210 determines that stopping the moving image recording operation has been instructed. Further, for example, when the operation mode currently selected via the mode selection switch is not the moving image recording mode, the CPU 210 determines that stopping the moving image recording operation has been instructed. If the instruction of stopping the moving image recording operation has been confirmed (YES in step S409), the operation of the CPU 210 proceeds from step S409 to step S410. In this case, the external apparatus 200 is brought into the recording stop state.

For example, when both of the power switch and the start/stop button are ON and the operation mode currently selected via the mode selection switch is the moving image recording mode, the CPU 210 determines that stopping the moving image recording operation has not been instructed. If the instruction of stopping the moving image recording operation has not been confirmed (NO in step S409), the operation of the CPU 210 returns from step S409 to step S408.

In step S410, the CPU 201 determines whether stopping the moving image recording mode operation has been instructed.

For example, when the power switch is ON and the operation mode currently selected via the mode selection switch is not the moving image recording mode, the CPU 201 determines that stopping the moving image recording mode operation has been instructed. Further, for example, when the power switch is OFF, the CPU 111 determines that stopping the moving image recording mode operation has been instructed. If the instruction of stopping the moving image recording mode operation has been confirmed (YES in step S410), the operation of the CPU 201 proceeds from step S410 to step S411.

For example, when the power switch is ON and the operation mode currently selected via the mode selection switch is the moving image recording mode, the CPU 201 determines that stopping the moving image recording mode operation has not been instructed. If the instruction of stopping the moving image recording mode operation has not been confirmed (NO in step S410), the operation of the CPU 201 returns from step S410 to step S403.

In step S411, the CPU 210 transmits a reception stop command to each of the communication unit A 201 and the communication unit B 202.

In response to the reception stop command, the communication unit A 201 stops the process for receiving each RAW image data and relevant additional information from the communication unit A 107 via the cable 300.

In response to the reception stop command, the communication unit B 202 stops the process for receiving each RAW image data and relevant additional information from the communication unit B 108 via the cable 301.

The CPU 210 terminates the moving image recording process C1 after completing the transmission of the reception stop command to each of the communication unit A 201 and the communication unit B 202.

Figure 5:
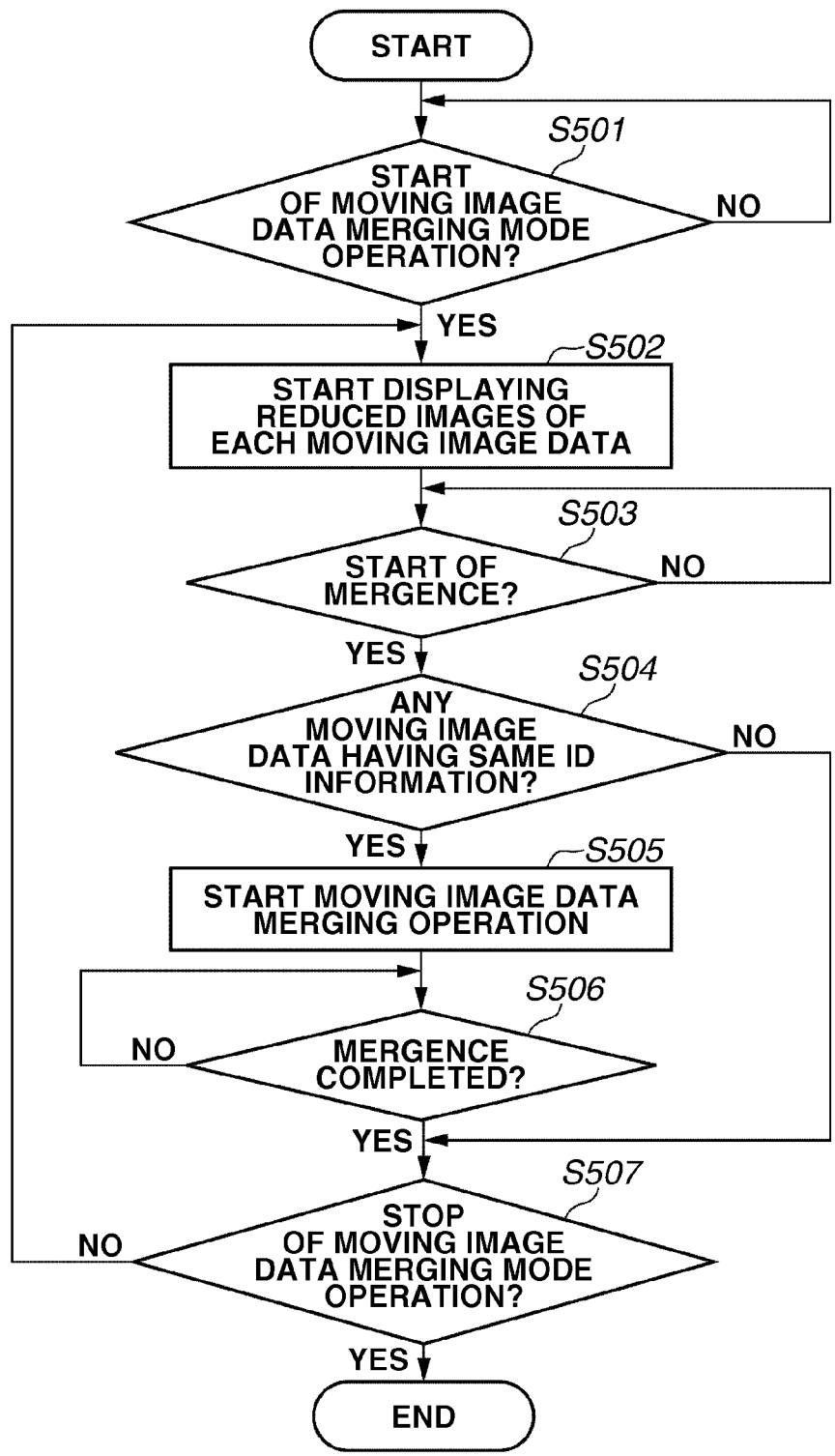
FIG. 5 is a flowchart illustrating moving image data merging process D1 that can be performed by the image data receiving apparatus according to the first exemplary embodiment.

Next, moving image data merging process D1 that can be performed by the external apparatus 200 according to the first exemplary embodiment is described in detail below with reference to FIG. 5. FIG. 5 is a flowchart illustrating the moving image data merging process D1 that can be performed by the external apparatus 200 according to the first exemplary embodiment. To realize the moving image data merging process D1, the CPU 210 executes the program Pg4 that can be loaded from the memory C 209.

In step S501, the CPU 201 determines whether starting an operation in the moving image data merging mode has been instructed. The moving image data merging mode is one of the operation modes provided beforehand for the external apparatus 200.

For example, when the power switch is ON and the operation mode currently selected via the mode selection switch is the moving image data merging mode, the CPU 201 determines that starting the moving image data merging mode operation has been instructed. If the instruction of starting the moving image data merging mode operation has been confirmed (YES in step S501), the operation of the CPU 201 proceeds from step S501 to step S502.

For example, if the operation mode currently selected via the mode selection switch is not the moving image data merging mode even when the power switch is ON, the CPU 201 determines that starting the moving image data merging mode operation has not been instructed. If the instruction of starting the moving image data merging mode operation has not been confirmed (NO in step S501), the CPU 201 repeats the above-mentioned process in step S501.

In step S502, the CPU 201 transmits an index display start command to the display control unit 206. In response to the index display start command, the display control unit 206 initiates a process for controlling the display device 207 in such a way that a reduced image (e.g., a representative image or a thumbnail image) that corresponds to each moving image data recorded in the storage device 205 can be displayed on the display device 207. For example, the display control unit 206 controls the display device 207 in such a way as to simultaneously display four, six, or eight reduced images. Further, for example, the display control unit 206 controls the display device 207 in such a way as to realize a scroll display for each group of four, six, or eight reduced images that correspond to each moving image data. A user can operate the cross button to select an intended reduced image of the moving image data to be reproduced.

The operation of the CPU 201 proceeds from step S502 to step S503 after completing the transmission of the index display start command to the display control unit 206.

In step S503, the CPU 201 determines whether starting the merging process has been instructed in a state where a single reduced image is selected.

For example, if the set button is pressed in a state where the single reduced image is selected, the CPU 201 determines that starting the merging process has been instructed. If the instruction of starting the merging process has been confirmed (YES in step S503), the operation of the CPU 201 proceeds from step S503 to step S504.

For example, if the set button is not pressed in a state where the single reduced image is selected, the CPU 201 determines that starting the merging process has not been instructed. If the instruction of starting the merging process has not been confirmed (NO in step S503), the CPU 201 repeats the above-mentioned process in step S503.

In step S504, the CPU 201 transmits a moving image data search command to the recording control unit 204. The moving image data search command includes ID information of the moving image data that corresponds to a user selecting reduced image at the instruction timing of starting the merging process. Hereinafter, the moving image data that corresponds to the user selecting reduced image at the instruction timing of starting the merging process is referred to as "moving image data mv3." In response to the moving image data search command, the recording control unit 204 initiates a process for searching the storage device 205 to acquire moving image data whose ID information is identical to the ID information of the moving image data mv3 included in the moving image data search command. Hereinafter, the moving image data whose ID information is identical to the ID information of the moving image data mv3 is referred to as "moving image data mv4." The presence of the moving image data mv4 in the storage device 205 can be notified from the recording control unit 204 to the CPU 201.

If the moving image data mv4 is present in the storage device 205 (YES in step S504), the operation of the CPU 201 proceeds from step S504 to step S505.

If the moving image data mv4 is not present in the storage device 205 (NO in step S504), the operation of the CPU 201 proceeds from step S504 to step S507.

In step S505, the CPU 201 transmits a moving image data merging command to the recording control unit 204. In response to the moving image data merging command, the recording control unit 204 initiates a process for sorting each RAW image data included in the moving image data mv3 and each RAW image data included in the moving image data mv4 according to their time code information and merging the moving image data mv3 and the moving image data mv4 as single moving image data. For example, if the frame rate of the moving image data mv3 and mv4 is 30 frame/sec, the frame rate of the merged moving image data is 60 frame/sec. Then, the recording control unit 204 records the merged moving image data in the storage device 205. However, if the merged moving image data includes a plurality of RAW image data having the same time code information, the recording control unit 204 records only one RAW image data in the storage device 205. Thus, it is feasible to prevent the same RAW image data from being repetitively recorded in the storage device 205. For example, the recording control unit 204 can determine the RAW image data to be recorded in the storage device 205 with reference to recording designation information described below when the merged moving image data includes two or more RAW image data that have the same time code information. The original moving image data can be reconstructed if the continuity is confirmed in the time code information when all of the RAW image data included in the moving image data mv3 and all of the RAW image data included in the moving image data mv4 are sorted according to their time code information.

In step S505, if a portion where time code information is not continuous is detected, the recording control unit 204 can divide the merged moving image data at the detected portion. Further, in step S505, if different ID information is detected, the recording control unit 204 can divide the merged moving image data.

Further, in step S505, the recording control unit 204 can record only a limited portion of the merged moving image data where the time code information is continuous, as a single or a plurality of moving image data, in the storage device 205. Further, in step S505, the recording control unit 204 can record only a limited portion of the merged moving image data where the ID information is identical, as a single or a plurality of moving image data, in the storage device 205.

The operation of the CPU 201 proceeds from step S505 to step S506 after completing the transmission of the moving image data merging command to the recording control unit 204.

In step S506, the CPU 201 determines whether the recording control unit 204 has completed the merging process. The confirmation result with respect to the merging process performed by the recording control unit 204 can be notified from the recording control unit 204 to the CPU 201.

If the recording control unit 204 has completed the merging process (YES in step S506), the operation of the CPU 201 proceeds from step S506 to step S507.

If the recording control unit 204 has not yet completed the merging process (NO in step S506), the CPU 201 repeats the above-mentioned process in step S506.

In step S507, the CPU 201 determines whether stopping the moving image data merging mode operation has been instructed.

For example, when the power switch is ON and the operation mode currently selected via the mode selection switch is not the moving image data merging mode, the CPU 201 determines that stopping the moving image data merging mode operation has been instructed. Further, for example, when the power switch is OFF, the CPU 201 determines that stopping the moving image data merging mode operation has been instructed. If the instruction of stopping the moving image data merging mode operation has been confirmed (YES in step S507), the CPU 201 terminates the moving image data merging process D1.

For example, when the power switch is ON and the operation mode currently selected via the mode selection switch is the moving image data merging mode, the CPU 201 determines that stopping the moving image data merging mode operation has not been instructed. If the instruction of stopping the moving image data merging mode operation has not been confirmed (NO in step S507), the operation of the CPU 111 returns from step S507 to step S502.

Figure 6:
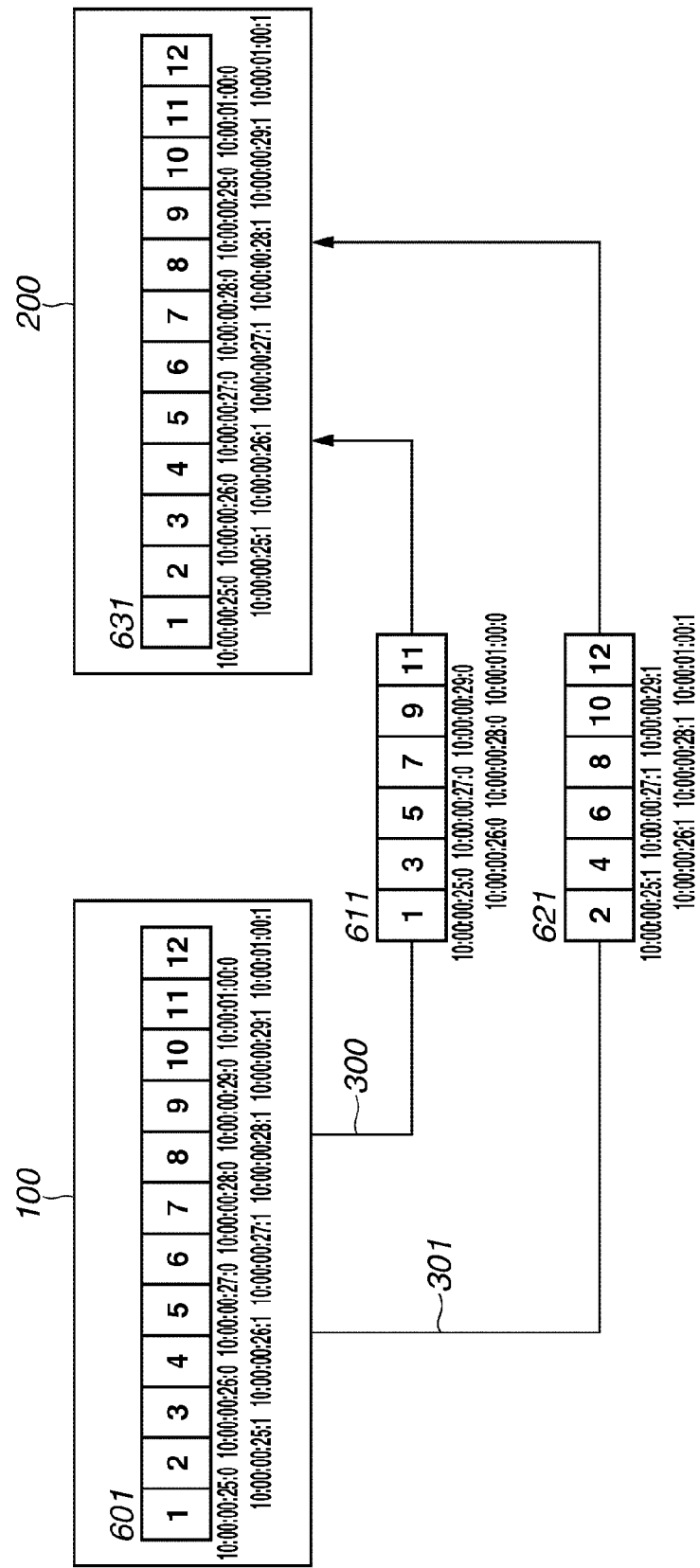
FIG. 6 illustrates an example of image data transmitting method that can be performed by the image data transmitting system according to the first exemplary embodiment.

Next, an image data transmitting method E11 that can be implemented between the image capture apparatus 100 and the external apparatus 200, as another example of image data transmitting method, is described in detail below with reference to FIG. 6. FIG. 6 illustrates details of the image data transmitting method E11.

The image data transmitting method E11 is employable when the image capture unit 101 generates a plurality of RAW image data at the frame rate of 60 frame/sec and each of the communication unit A 107 and the communication unit B 108 transmits a plurality of RAW image data at the frame rate of 30 frame/sec.

Further, the image data transmitting method E11 is employable when the frame rate of the moving image data reproduced from the storage device 104 is 60 frame/sec and each of the communication unit A 107 and the communication unit B 108 transmits a plurality of RAW image data at the frame rate of 30 frame/sec.

According to the image data transmitting method E11, any one of the cables 300 and 301 is selectable as a transmission path to be used in transmitting RAW image data for each frame.

In FIG. 6, moving image data 601 includes a plurality of RAW image data generated by the image capture unit 101. The frame rate of the moving image data 601 is 60 frame/sec. The moving image data 601 illustrated in FIG. 6 includes RAW image data of twelve frames. However, the number of frames included in the moving image data 601 is not limited to 12.

Time code information is associated with each of the plurality of RAW image data included in the moving image data 601.

As illustrated in FIG. 6, the time code information associated with the RAW image data of 12 frames included in the moving image data 601 is "10:00:00:25.0" to "10:00:01:00.1." As illustrated in FIG. 6, the time code information associated with the RAW image data of the first frame is "10:00:00:25.0" and the time code information associated with the RAW image data of the second frame is "10:00:00:

25.1." Further, as illustrated in FIG. 6, the time code information associated with the RAW image data of the twelfth frame is "10:00:01:00.0" and the time code information associated with the RAW image data of the twelfth frame is "10:00:01:00.1."

The image capture apparatus 100 operates in such a way as to transmit the RAW image data of an odd-number frame to the external apparatus 200 via the cable 300. Further, the image capture apparatus 100 operates in such a way as to transmit the RAW image data of an even-number frame to the external apparatus 200 via the cable 301. Thus, the RAW image data of the 1st, 3rd, 5th, 7th, 9th, 11th, ..., and (2n−1)th frames are transmitted from the image capture apparatus 100 to the external apparatus 200 via the cable 300. Further, RAW image data of the 2nd, 4th, 6th, 8th, 10th, 12th, ..., and (2n)th frames are transmitted from the image capture apparatus 100 to the external apparatus 200 via the cable 301.

In FIG. 6, moving image data 611 is moving image data generated from the moving image data 601 and transmitted from the image capture apparatus 100 to the external apparatus 200 via the cable 300. According to the example illustrated in FIG. 6, each RAW image data including "0" as the last value of the time code information is transmitted from the image capture apparatus 100 to the external apparatus 200 via the cable 300.

In FIG. 6, moving image data 621 is moving image data generated from the moving image data 601 and transmitted from the image capture apparatus 100 to the external apparatus 200 via the cable 301. According to the example illustrated in FIG. 6, each RAW image data including "1" as the last value of the time code information is transmitted from the image capture apparatus 100 to the external apparatus 200 via the cable 301.

The image capture apparatus 100 operates in such a way as to transmit the RAW image data of the (2n−1)th frame and the RAW image data of the (2n)th frame to the external apparatus 200 via the cables 300 and 301 at the same time. Thus, the external apparatus 200 can receive the RAW image data of the (2n−1)th frame and the RAW image data of the (2n)th frame from the image capture apparatus 100 via the cables 300 and 301 at the same time.

The external apparatus 200 determines the continuity between the RAW image data of the (2n−1)th frame and the RAW image data of the (2n)th frame each time when the RAW image data of one frame is received via the cable 300 or 301. For example, when the time code information of the RAW image data of the (2n−1)th frame is "10:00:00:25.0", if the time code information of the RAW image data of the (2n)th frame is "10:00:00:25.1", the external apparatus 200 determines that the (2n−1)th frame and the (2n)th frame "are continuous." For example, when the time code information of the RAW image data of the (2n−1)th frame is "10:00:00:25.0", if the time code information of the RAW image data of the (2n)th frame is not "10:00:00:25.1", the external apparatus 200 determines that the (2n−1)th frame and the (2n)th frame "are not continuous."

Further, the external apparatus 200 determines the continuity between the RAW image data of the (2n−1)th frame and the RAW image data of the (2n+1)th frame each time when the RAW image data of two consecutive frames is received via the cable 300. For example, when the time code information of the RAW image data of the (2n−1)th frame is "10:00:00:25.0", if the time code information of the RAW image data of the (2n+1)th frame is "10:00:00:26.0", the external apparatus 200 determines that the (2n−1)th frame and the (2n+1)th frame "are continuous." For example, when the time code information of the RAW image data of the (2n−1)th frame is "10:00:00:25.0", if the time code information of the RAW image data of the (2n+1)th frame is not "10:00:00:26.0", the external apparatus 200 determines that the (2n−1)th frame and the (2n+1)th frame "are not continuous."

Further, the external apparatus 200 determines the continuity between the RAW image data of the (2n)th frame and the RAW image data of the (2n+2)th frame each time when the RAW image data of two frames is received via the cable 301. For example, when the time code information of the RAW image data of the (2n)th frame is "10:00:00:25.1", if the time code information of the RAW image data of the (2n+2)th frame is "10:00:00:26.1", the external apparatus 200 determines that the (2n)th frame and the (2n+2)th frame "are continuous." For example, when the time code information of the RAW image data of the (2n)th frame is "10:00:00:25.1", if the time code information of the RAW image data of the (2n+2)th frame is not "10:00:00:26.1", the external apparatus 200 determines that the (2n)th frame and the (2n+2)th frame "are not continuous."

The external apparatus 200 generates moving image data 631 as a combination of the moving image data 611 received from the image capture apparatus 100 via the cable 300 and the moving image data 621 received from the image capture apparatus 100 via the cable 301. The continuity of the moving image data 631 can be confirmed only when there is not any non-continuous portion in the moving image data 611 and there is not any non-continuous portion in the moving image data 621, and further there is not any non-continuous portion between the moving image data 611 and the moving image data 621. In this case, the moving image data 631 coincides with the moving image data 601. Further, in this case, the moving image data 631 is moving image data having no lack of frames.

As mentioned above, according to the image data transmitting method E11, the image capture apparatus 100 can select any one of the cables 300 and 301 as the transmission path to be used in transmitting RAW image data for each frame.

Further, according to the image data transmitting method E11, the external apparatus 200 can determine the continuity between the RAW image data of the (2n−1)th frame and the RAW image data of the (2n)th frame each time when the RAW image data of one frame is received via the cable 300 or 301. Thus, the external apparatus 200 can detect the presence of any non-continuous portion in the moving image data 611 and the moving image data 621 that are to be combined together.

Further, according to the image data transmitting method E11, the external apparatus 200 can determine the continuity between the RAW image data of the (2n−1)th frame and the RAW image data of the (2n+1)th frame each time when the RAW image data of two frames is received via the cable 300. Thus, the external apparatus 200 can detect any non-continuous portion if it is present in the moving image data 611.

Further, according to the image data transmitting method E11, the external apparatus 200 can determine the continuity between the RAW image data of the (2n)th frame and the RAW image data of the (2n+2)th frame each time when RAW image data of two frames is received via the cable 301. Thus, the external apparatus 200 can detect any non-continuous portion if it is present in the moving image data 621.

Figure 7:
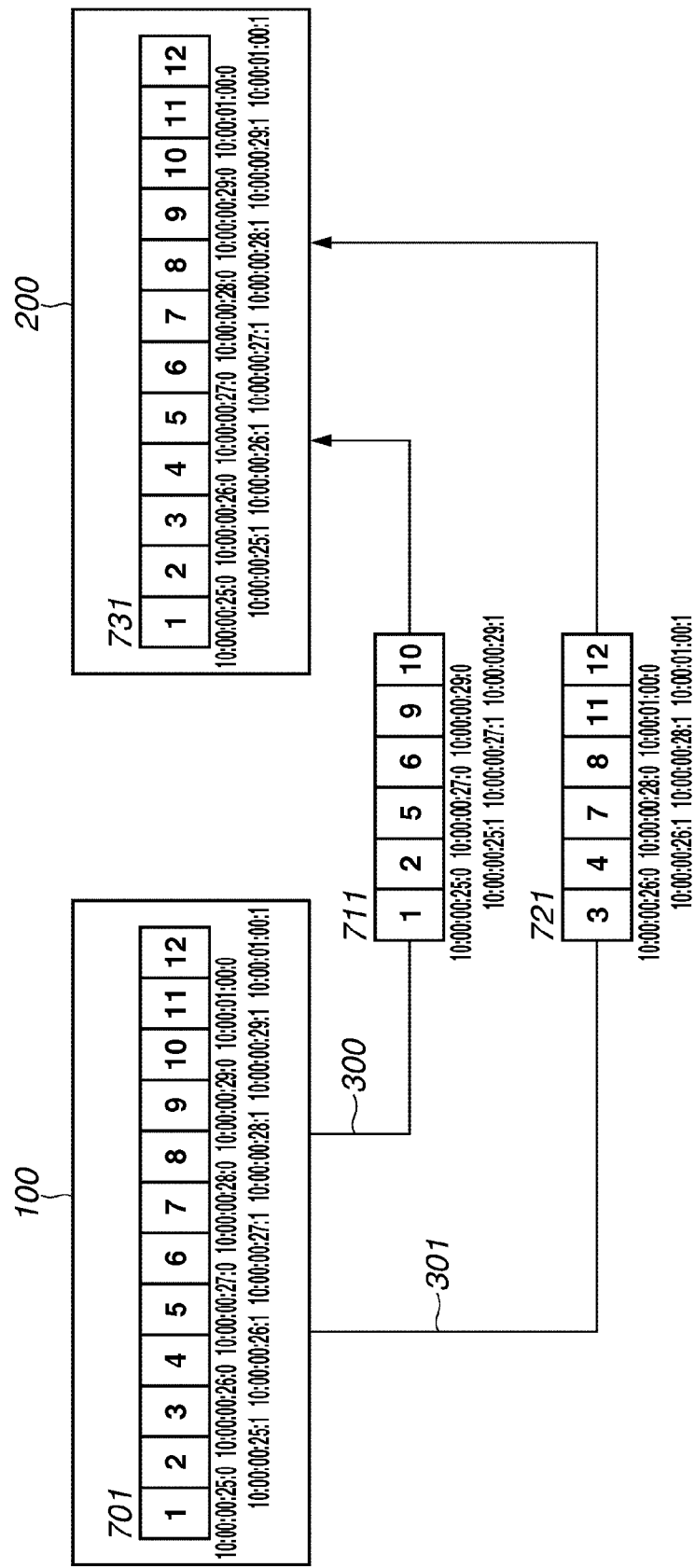
FIG. 7 illustrates another example of image data transmitting method that can be performed by the image data transmitting system according to the first exemplary embodiment.

Next, an image data transmitting method E12 that can be implemented between the image capture apparatus 100 and the external apparatus 200, as another example of image data transmitting method, is described in detail below with reference to FIG. 7. FIG. 7 illustrates details of the image data transmitting method E12.

The image data transmitting method E12 is employable when the image capture unit 101 generates a plurality of RAW image data at the frame rate of 60 frame/sec and each of the communication unit A 107 and the communication unit B 108 transmits a plurality of RAW image data at the frame rate of 30 frame/sec.

Further, the image data transmitting method E12 is employable when the frame rate of the moving image data reproduced from the storage device 104 is 60 frame/sec and each of the communication unit A 107 and the communication unit B 108 transmits a plurality of RAW image data at the frame rate of 30 frame/sec.

According to the image data transmitting method E12, any one of the cables 300 and 301 is selectable as a transmission path to be used in transmitting RAW image data of two consecutive frames.

In FIG. 7, the moving image data 701 includes a plurality of RAW image data generated by the image capture unit 101. The frame rate of the moving image data 701 is 60 frame/sec. The moving image data 701 illustrated in FIG. 7 includes RAW image data of twelve frames. However, the number of frames included in the moving image data 701 is not limited to 12.

Time code information is associated with each of the plurality of RAW image data included in the moving image data 701.

As illustrated in FIG. 7, time code information associated with the RAW image data of 12 frames included in the moving image data 701 is "10:00:00:25.0" to "10:00:01:00.1." As illustrated in FIG. 7, the time code information associated with the RAW image data of the first frame is "10:00:00:25.0" and the time code information associated with the RAW image data of the second frame is "10:00:00:25.1." Further, as illustrated in FIG. 7, the time code information associated with the RAW image data of the twelfth frame is "10:00:01:00.0" and the time code information associated with the RAW image data of the twelfth frame is "10:00:01:00.1."

The image capture apparatus 100 operates in such a way as to transmit RAW image data of two consecutive frames from the image capture apparatus 100 to the external apparatus 200 alternatively via the cable 300 or the cable 301. Thus, the RAW image data of the 1st, 2nd, 5th, 6th, 9th, 10th, (4n−3)th, and (4n−2)th frames are transmitted from the image capture apparatus 100 to the external apparatus 200 via the cable 300. Further, the RAW image data of the 3rd, 4th, 7th, 8th, 11th, 12th, . . . , (4n−1)th, and (4n)th frames are transmitted from the image capture apparatus 100 to the external apparatus 200 via the cable 301.

In FIG. 7, moving image data 711 is moving image data generated from the moving image data 701 and transmitted from the image capture apparatus 100 to the external apparatus 200 via the cable 300.

In FIG. 7, moving image data 721 is moving image data generated from the moving image data 701 and transmitted from the image capture apparatus 100 to the external apparatus 200 via the cable 301.

The image capture apparatus 100 operates in such a way as to transmit the RAW image data of the (4n−3)th frame and the RAW image data of the (4n−1)th frame to the external apparatus 200 via the cables 300 and 301 at the same time. Thus, the external apparatus 200 can receive the RAW image data of the (4n−3)th frame and the RAW image data of the (4n−1)th frame from the image capture apparatus 100 via the cables 300 and 301 at the same time.

Further, the image capture apparatus 100 operates in such a way as to transmit the RAW image data of the (4n−2)th frame and the RAW image data of the (4n)th frame to the external apparatus 200 via the cables 300 and 301 at the same time. Thus, the external apparatus 200 can receive the RAW image data of the (4n−2)th frame and the RAW image data of the (4n)th frame from the image capture apparatus 100 via the cables 300 and 301 at the same time.

The external apparatus 200 determines the continuity between the RAW image data of the (4n−3)th frame and the RAW image data of the (4n−2)th frame each time when RAW image data of two frames is received via the cable 300. For example, when the time code information of the RAW image data of the (4n−3)th frame is "10:00:00:25.0", if the time code information of the RAW image data of the (4n−2)th frame is "10:00:00:25.1", the external apparatus 200 determines that the (4n−3)th frame and the (4n−2)th frame "are continuous." For example, when the time code information of the RAW image data of the (4n−3)th frame is "10:00:00:25.0", if the time code information of the RAW image data of the (4n−2)th frame is not "10:00:00:25.1", the external apparatus 200 determines that the (4n−3)th frame and the (4n−2)th frame "are not continuous."

Further, the external apparatus 200 determines the continuity between the RAW image data of the (4n−1)th frame and the RAW image data of the (4n)th frame each time when RAW image data of two frames is received via the cable 301. For example, when the time code information of the RAW image data of the (4n−1)th frame is "10:00:00:26.0", if the time code information of the RAW image data of the (4n)th frame is "10:00:00:26.1", the external apparatus 200 determines that the (4n−1)th frame and the (4n)th frame "are continuous." For example, when the time code information of the RAW image data of the (4n−1)th frame is "10:00:00:26.0", if time code information of the RAW image data of the (4n)th frame is not "10:00:00:26.1", the external apparatus 200 determines that the (4n−1)th frame and the (4n)th frame "are not continuous."

Further, the external apparatus 200 determines the continuity between the RAW image data of the (4n−3)th frame and the RAW image data of the (4n−1)th frame each time when RAW image data of two frames is received from the cable 300 and 301. For example, when the time code information of the RAW image data of the (4n−3)th frame is "10:00:00:25.0", if the time code information of the RAW image data of the (4n−1)th frame is "10:00:00:26.0", the external apparatus 200 determines that the (4n−3)th frame and the (4n−1)th frame "are continuous." For example, when the time code information of the RAW image data of the (4n−3)th frame is "10:00:00:25.0", if the time code information of the RAW image data of the (4n−1)th frame is not "10:00:00:26.0", the external apparatus 200 determines that the (4n−3)th frame and the (4n−1)th frame "are not continuous."

Further, the external apparatus 200 determines the continuity between the RAW image data of the (4n−3)th frame and the RAW image data of the (4n+1)th frame each time when RAW image data of two frames is received via the cable 300. For example, when the time code information of the RAW image data of the (4n−3)th frame is "10:00:00:25.0", if the time code information of the RAW image data of the (4n+1)th frame is "10:00:00:27.0", the external apparatus 200 determines that the (4n−3)th frame and the (4n+1)th frame "are continuous." For example, when the time code information of the RAW image data of the (4n−3)th frame is "10:00:00:25.0", if the time code information of the RAW image data of the (4n+1)th frame is not "10:00:00:27.0", the external apparatus 200 determines that the (4n−3)th frame and the (4n+1)th frame "are not continuous."

Further, the external apparatus 200 determines the continuity between the RAW image data of the (4n−1)th frame and the RAW image data of the (4n+3)th frame each time when RAW image data of two frames is received via the cable 301. For example, when the time code information of the RAW image data of the (4n−1)th frame is "10:00:00:26.0", if the time code information of the RAW image data of the (4n+3)th frame is "10:00:00:28.0", the external apparatus 200 determines that the (4n−1)th frame and the (4n+3)th frame "are continuous." For example, when the time code information of the RAW image data of the (4n−1)th frame is "10:00:00:26.0", if the time code information of the RAW image data of the (4n+3)th frame is not "10:00:00:28.0", the external apparatus 200 determines that the (4n−1)th frame and the (4n+3)th frame "are not continuous."

The external apparatus 200 generates moving image data 731 as a combination of the moving image data 721 received from the image capture apparatus 100 via the cable 300 and the moving image data 721 received from the image capture apparatus 100 via the cable 301. The continuity of the moving image data 731 can be confirmed only when there is not any non-continuous portion in the moving image data 711 and there is not any non-continuous portion in the moving image data 721, and further there is not any non-continuous portion between the moving image data 711 and the moving image data 721. In this case, the moving image data 731 coincides with the moving image data 701. Further, in this case, the moving image data 731 is moving image data having no lack of frames.

As mentioned above, according to the image data transmitting method E12, the image capture apparatus 100 can select any one of the cables 300 and 301 as the transmission path to be used in transmitting RAW image data for two consecutive frames.

Further, according to the image data transmitting method E12, the external apparatus 200 can determine the continuity between the RAW image data of the (4n−3)th frame and the RAW image data of the (4n−2)th frame each time when moving image data of two frames is received via the cable 300. Thus, the external apparatus 200 can detect any non-continuous portion if it is present in the moving image data 711.

Further, according to the image data transmitting method E12, the external apparatus 200 can determine the continuity between the RAW image data of the (4n−1)th frame and the RAW image data of the (4n)th frame each time when moving image data of two frames is received via the cable 301. Thus, the external apparatus 200 can detect any non-continuous portion if it is present in the moving image data 721.

Further, according to the image data transmitting method E12, the external apparatus 200 can determine the continuity between the RAW image data of the (4n−3)th frame and the RAW image data of the (4n−1)th frame each time when RAW image data of two frames is received via the cable 301. Thus, the external apparatus 200 can detect the presence of any non-continuous portion in the moving image data 711 and the moving image data 721 that are combined together.

Further, according to the image data transmitting method E12, the external apparatus 200 can determine the continuity between the RAW image data of the (4n−3)th frame and the RAW image data of the (4n+1)th frame each time when RAW image data of two frames is received via the cable 300. Thus, the external apparatus 200 can detect any non-continuous portion if it is present in the moving image data 711.

Further, according to the image data transmitting method E12, the external apparatus 200 can determine the continuity between the RAW image data of the (4n−1)th frame and the RAW image data of the (4n+3)th frame each time when RAW image data of two frames is received via the cable 301. Thus, the external apparatus 200 can detect any non-continuous portion if it is present in the moving image data 721.

Figure 8:
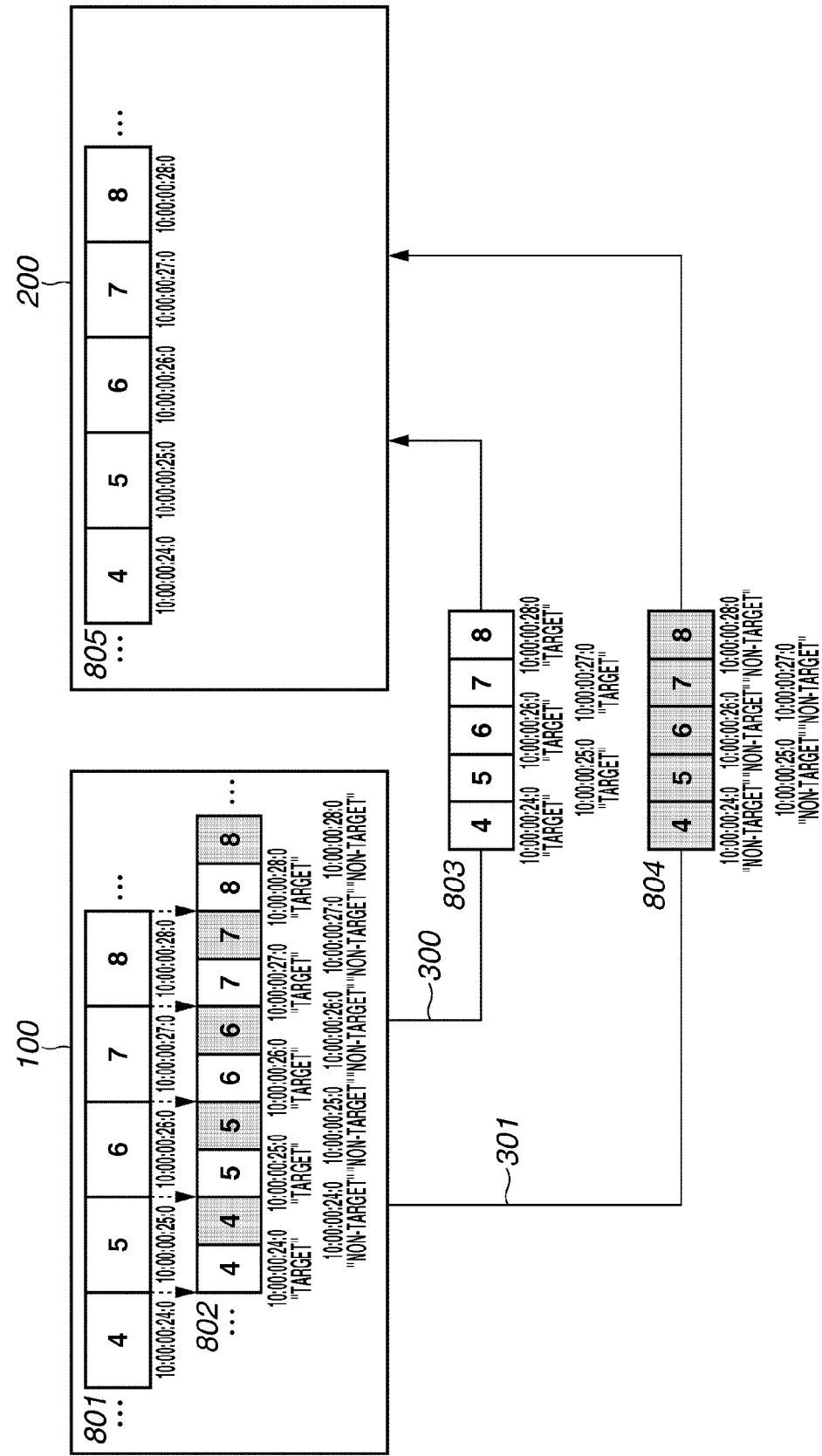
FIG. 8 illustrates another example of image data transmitting method that can be performed by the image data transmitting system according to the first exemplary embodiment.

Next, an image data transmitting method E21 that can be implemented between the image capture apparatus 100 and the external apparatus 200, as another example of image data transmitting method, is described in detail below with reference to FIG. 8. FIG. 8 illustrates details of the image data transmitting method E21.

The image data transmitting method E21 is employable when the image capture unit 101 generates a plurality of RAW image data at the frame rate of 30 frame/sec and each of the communication unit A 107 and the communication unit B 108 transmits a plurality of RAW image data at the frame rate of 30 frame/sec.

Further, the image data transmitting method E21 is employable when the frame rate of the moving image data reproduced from the storage device 104 is 30 frame/sec and each of the communication unit A 107 and the communication unit B 108 transmits a plurality of RAW image data at the frame rate of 30 frame/sec.

In FIG. 8, moving image data 801 includes a plurality of RAW image data generated by the image capture unit 101. The frame rate of the moving image data 801 is 30 frame/sec.

In FIG. 8, moving image data 802 includes a plurality of RAW image data to be supplied to the communication unit A 107 and a plurality of RAW image data to be supplied to the communication unit B 108. The frame rate of the moving image data 802 is 60 frame/sec.

In FIG. 8, moving image data 803 includes a plurality of RAW image data transmitted from the communication unit A 107. The frame rate of the moving image data 803 is 30 frame/sec.

In FIG. 8, moving image data 804 includes a plurality of RAW image data transmitted from the communication unit B 108. The frame rate of the moving image data 804 is 30 frame/sec.

In FIG. 8, moving image data 805 is moving image data merged by the external apparatus 200 and recorded in the storage device 205. The frame rate of the moving image data 805 is 30 frame/sec.

According to the image data transmitting method E21, the same RAW image data is transmitted from each of the communication unit A 107 and the communication unit B 108. Therefore, the CPU 111 adds recording designation information indicating either "target" or "non-target" to the additional information of each RAW image data output from the communication unit A 107 and the communication unit B 108. When the recording designation information of a currently processed RAW image data indicates "target", the external apparatus 200 prioritizes recording or displaying of the RAW image data to be processed. When the recording designation information of a currently processed RAW image data indicates "non-target", the external apparatus 200 does not prioritize the recording or displaying of the RAW image data to be processed.

In the image data transmitting method E21, the CPU 111 performs a process for adding recording designation information T1 indicating "target" to the additional information of each RAW image data if it is output from the communication unit A 107. Further, in the image data transmitting method E21, the CPU 111 performs a process for adding recording designation information T2 indicating "non-target" to the additional information of each RAW image data if it is output from the communication unit B 108.

When the merging recording function is ON, the recording control unit 204 of the external apparatus 200 determines whether the recording designation information of each RAW image data is "target" or "non-target." If the recording designation information of the RAW image data is "non-target", the recording control unit 204 does not cause the storage device 205 to record the RAW image data. Thus, even when the same RAW image data is transmitted from each of the communication unit A 107 and the communication unit B 108, the external apparatus 200 can prioritize recording one of two the same RAW image data. As a result, according to the image data transmitting method E21, it is feasible to prevent the same RAW image data from being repetitively recorded in the storage device 205.

The image data transmitting method E21 can be modified in such a way as to add recording designation information to only the additional information of RAW image data output from the communication unit B 108.

As mentioned above, according to the image data transmitting method E21, it is feasible to cause the external apparatus 200 to prioritize the recording of a plurality of RAW image data transmitted from the communication unit A 107. Thus, even when the cable 301 is disconnected from the image capture apparatus 100 or the external apparatus 200, the external apparatus 200 can continuously record a plurality of RAW image data transmitted via the cable 300.

The recording control unit 204 can a repetitive transmission of the same RAW image data even when the content of the recording designation information is changed due to a transmission error.

Figure 16:
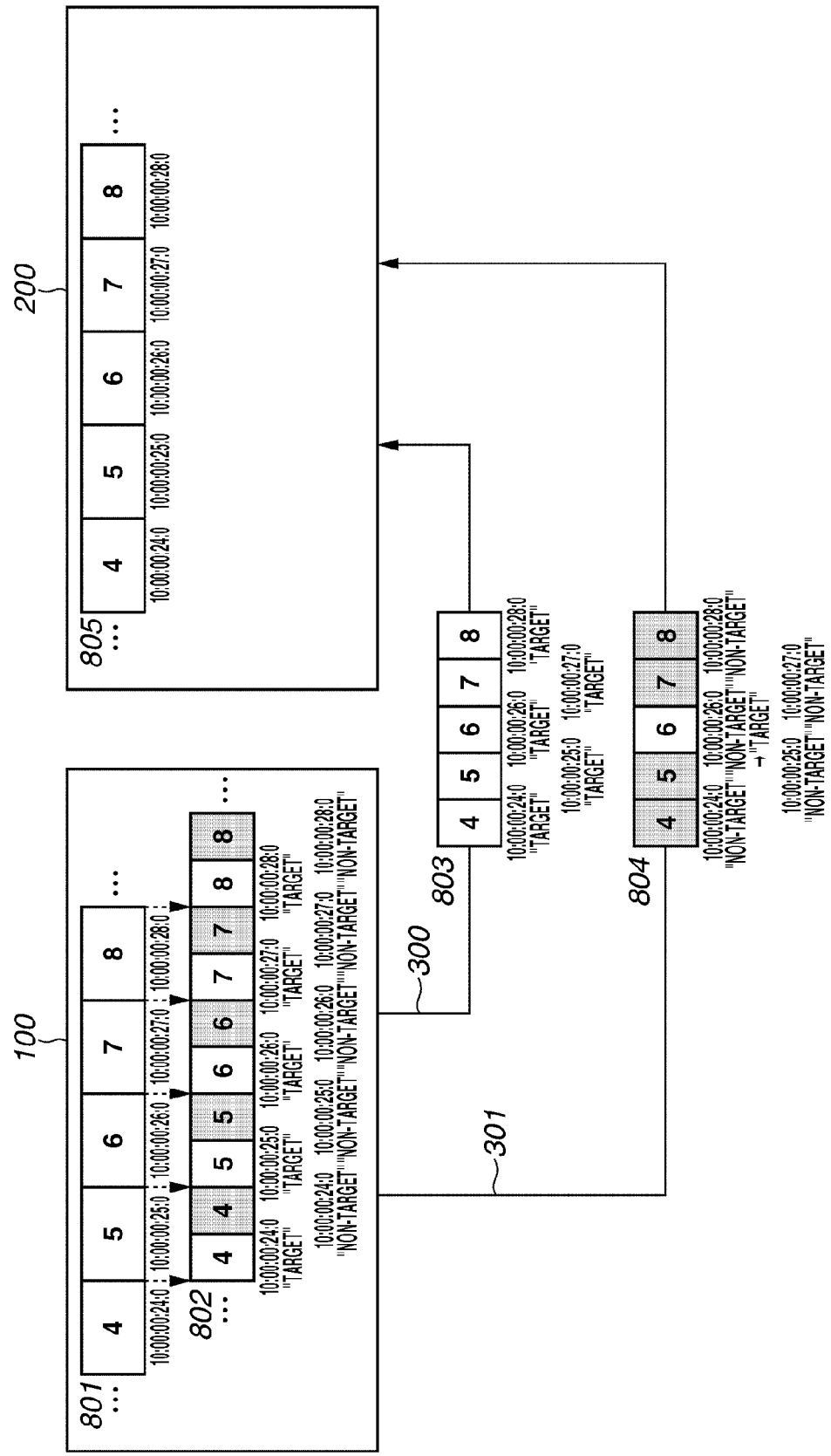
FIG. 16 illustrates another example of image data transmitting method that can be performed by the image data transmitting system according to the first exemplary embodiment.

For example, it is now assumed that the RAW image data transmitted via the cable 301 includes RAW image data having time code information "10:00:00:26.0" and the recording designation information thereof indicates "target", or not "non-target", as illustrated in FIG. 16. In this case, the RAW image data having the time code information "10:00:00:26.0" can be input via each of the cable 300 and the cable 301. Therefore, the recording control unit 204 can detect a repetitive reception of the RAW image data having the time code information "10:00:00:26.0." Thus, in this case, each of two RAW image data having the time code information "10:00:00:26.0" includes the recording designation information indicating "target." Therefore, the recording control unit 204 records either one of these two RAW image data in the storage device 205.

Figure 17:
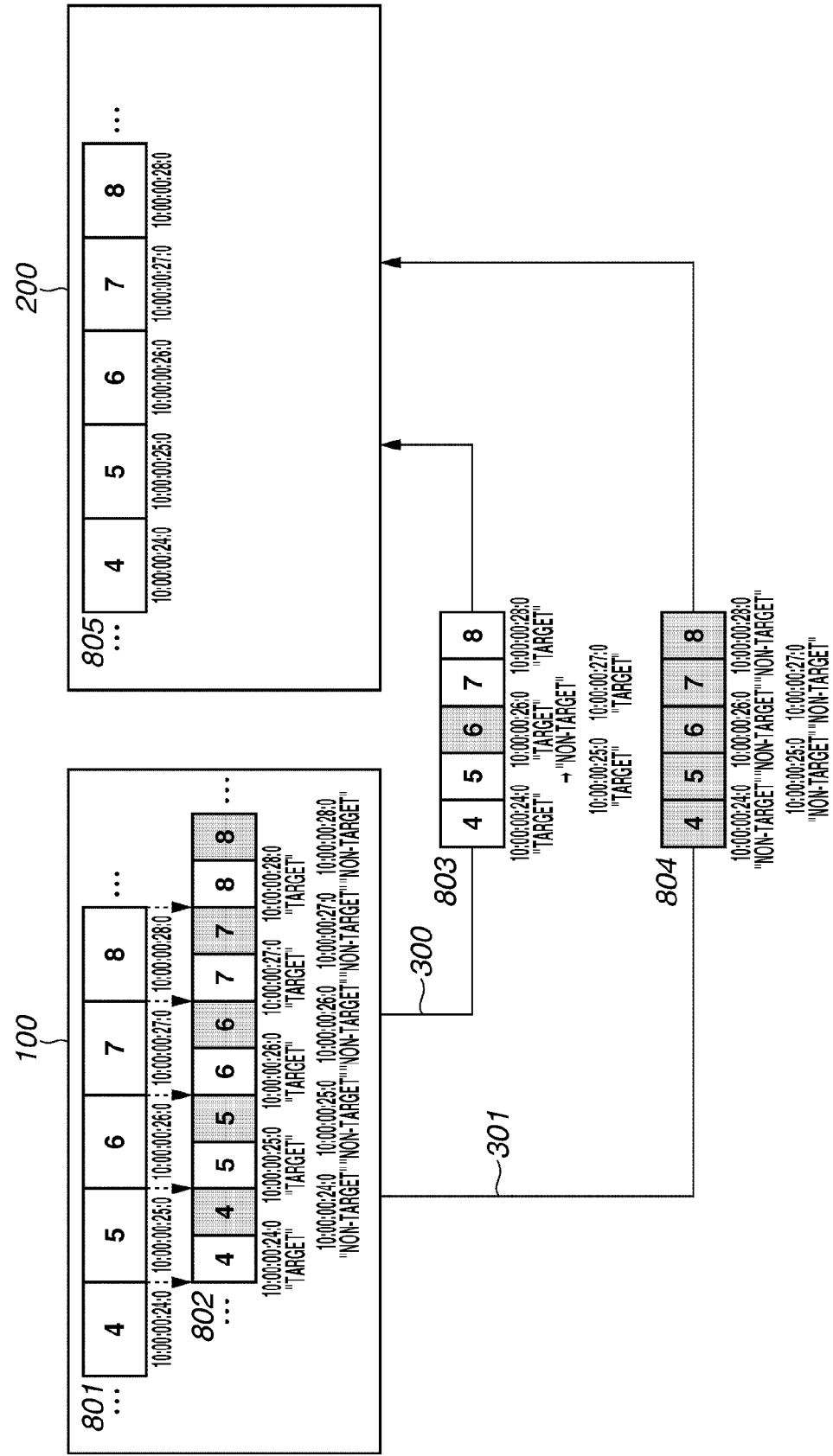
FIG. 17 illustrates another example of image data transmitting method that can be performed by the image data transmitting system according to the first exemplary embodiment.

Further, for example, it is assumed that the RAW image data transmitted via the cable 300 includes RAW image data having the time code information "10:00:00:26.0" and the recording designation information thereof indicates "non-target", or not "target", as illustrated in FIG. 17. In this case, the RAW image data having the time code information "10:00:00:26.0" can be input via each of the cable 300 and the cable 301. Therefore, the recording control unit 204 can detect a repetitive reception of the RAW image data having the time code information "10:00:00:26.0." Thus, in this case, each of two RAW image data having the time code information "10:00:00:26.0" includes the recording designation information indicating "non-target." Therefore, the recording control unit 204 records either one of these two RAW image data in the storage device 205.

Figure 9:
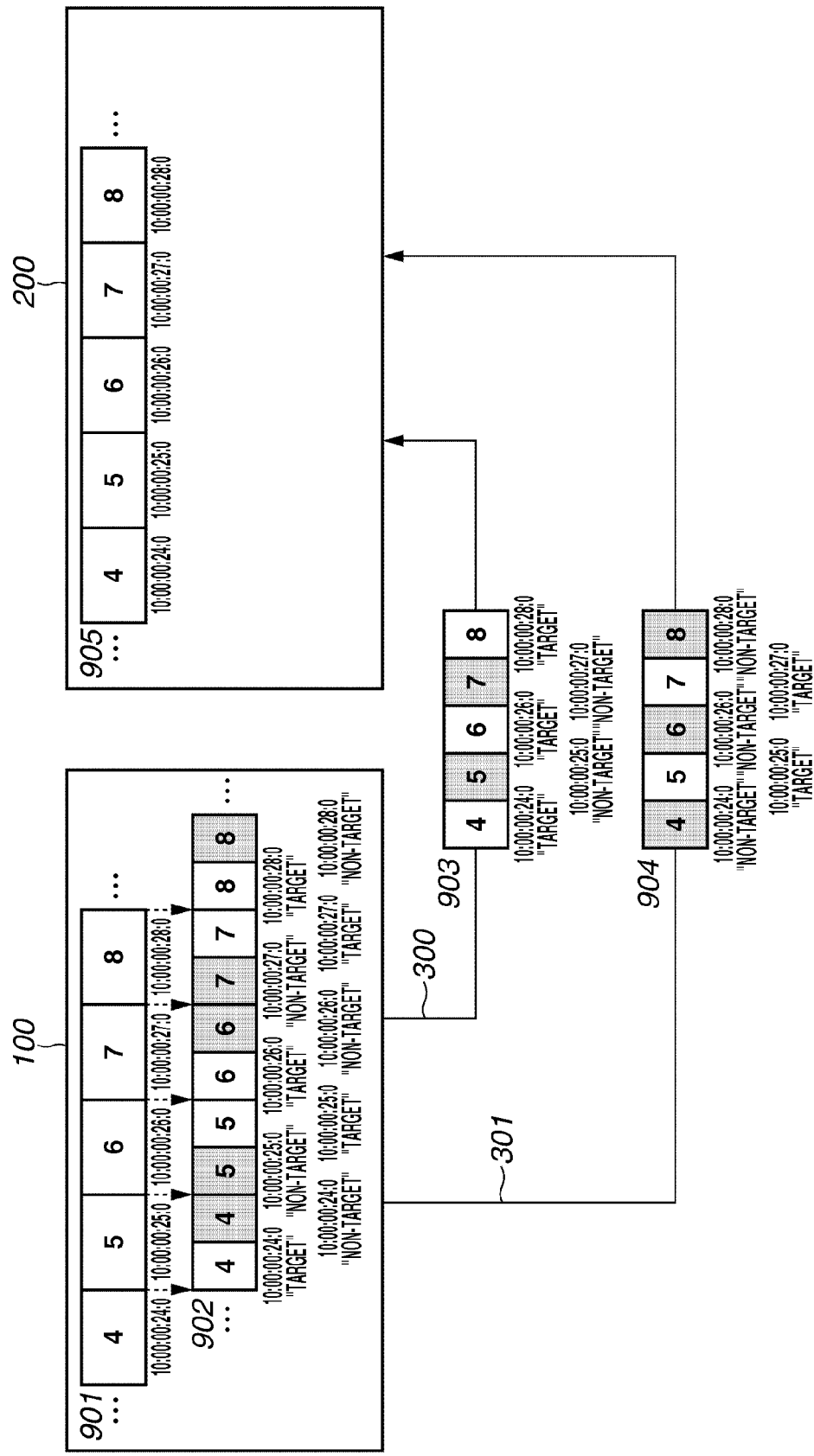
FIG. 9 illustrates another example of image data transmitting method that can be performed by the image data transmitting system according to the first exemplary embodiment.

Next, an image data transmitting method E22 that can be implemented between the image capture apparatus 100 and the external apparatus 200, as another example of image data transmitting method, is described in detail below with reference to FIG. 9. FIG. 9 illustrates details of the image data transmitting method E22.

The image data transmitting method E22 is employable when the image capture unit 101 generates a plurality of RAW image data at the frame rate of 30 frame/sec and each of the communication unit A 107 and the communication unit B 108 transmits a plurality of RAW image data at the frame rate of 30 frame/sec.

Further, the image data transmitting method E22 is employable when the frame rate of the moving image data reproduced from the storage device 104 is 30 frame/sec and each of the communication unit A 107 and the communication unit B 108 transmits a plurality of RAW image data at 30 frame/sec.

In FIG. 9, moving image data 901 includes a plurality of RAW image data generated by the image capture unit 101. The frame rate of the moving image data 901 is 30 frame/sec.

In FIG. 9, moving image data 902 includes a plurality of RAW image data to be supplied to the communication unit A 107 and a plurality of RAW image data to be supplied to the communication unit B 108. The frame rate of the moving image data 902 is 60 frame/sec.

In FIG. 9, moving image data 903 includes a plurality of RAW image data transmitted from the communication unit A 107. The frame rate of the moving image data 903 is 30 frame/sec.

In FIG. 9, moving image data 904 includes a plurality of RAW image data transmitted from the communication unit A 107. The frame rate of the moving image data 904 is 30 frame/sec.

In FIG. 9, moving image data 905 is moving image data merged by the external apparatus 200 and recorded in the storage device 205. The frame rate of the moving image data 905 is 30 frame/sec.

According to the image data transmitting method E22, the same RAW image data is transmitted from each of the communication unit A 107 and the communication unit B 108. Therefore, the CPU 111 adds recording designation information indicating either "target" or "non-target" to the additional information of each RAW image data output from the communication unit A 107 and the communication unit B 108, as illustrated in FIG. 9.

When the merging recording function is ON, the recording control unit 204 of the external apparatus 200 determines whether the recording designation information of each RAW image data is "target" or "non-target." Then, if the recording designation information of the RAW image data is "non-target", the recording control unit 204 does not cause the storage device 205 to record the RAW image data. Thus, even when the same RAW image data is transmitted from each of the communication unit A 107 and the communication unit B 108, the external apparatus 200 can prioritize recording one of two the same RAW image data. As a result, according to the image data transmitting method E22, it is feasible to prevent the same RAW image data from being repetitively recorded in the storage device 205.

Figure 10:
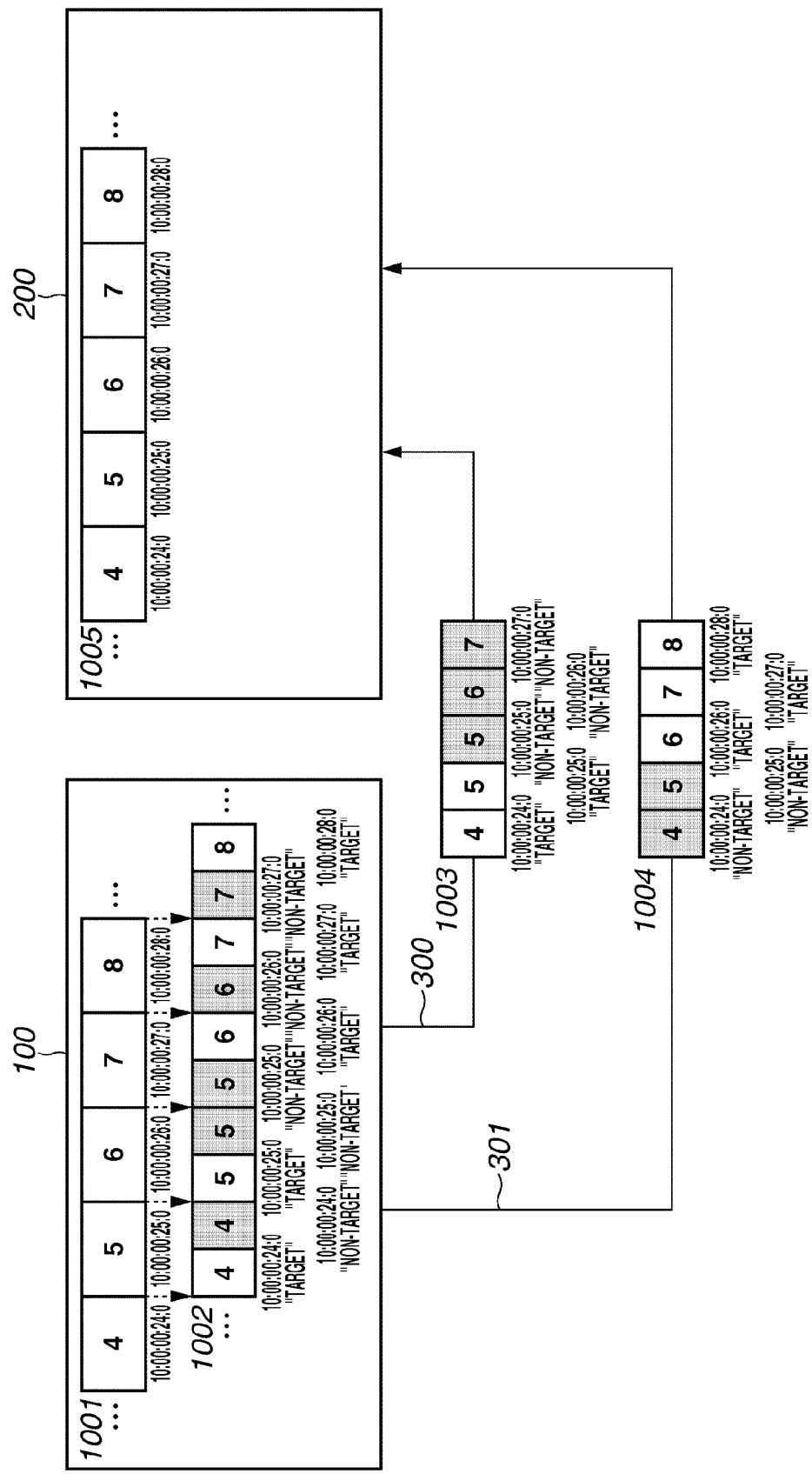
FIG. 10 illustrates another example of image data transmitting method that can be performed by the image data transmitting system according to the first exemplary embodiment.

Next, an image data transmitting method E31 that can be implemented between the image capture apparatus 100 and the external apparatus 200, as example of the image data transmitting method, is described in detail below with reference to FIG. 10. FIG. 10 illustrates details of the image data transmitting method E31.

The image data transmitting method E31 is employable when the image capture unit 101 generates a plurality of RAW image data at the frame rate of 29 frame/sec and each of the communication unit A 107 and the communication unit B 108 transmits a plurality of RAW image data at the frame rate of 30 frame/sec.

Further, the image data transmitting method E31 is employable when the frame rate of the moving image data reproduced from the storage device 104 is 29 frame/sec and each of the communication unit A 107 and the communication unit B 108 transmits a plurality of RAW image data at the frame rate of 30 frame/sec.

In FIG. 10, moving image data 1001 includes a plurality of RAW image data generated by the image capture unit 101. The frame rate of the moving image data 1001 is 29 frame/sec.

In FIG. 10, moving image data 1002 includes a plurality of RAW image data to be supplied to the communication unit A 107 and a plurality of RAW image data to be supplied to the communication unit B 108. The frame rate of the moving image data 1002 is 60 frame/sec.

In FIG. 10, moving image data 1003 includes a plurality of RAW image data transmitted from the communication unit A 107. The frame rate of the moving image data 1003 is 30 frame/sec.

In FIG. 10, moving image data 1004 includes a plurality of RAW image data transmitted from the communication unit A 107. The frame rate of the moving image data 1004 is 30 frame/sec.

In FIG. 10, moving image data 1005 is moving image data merged by the external apparatus 200 and recorded in the storage device 205. The frame rate of the moving image data 1005 is 29 frame/sec.

According to the image data transmitting method E31, the same RAW image data is transmitted once or more from each of the communication unit A 107 and the communication unit B 108. Therefore, the CPU 111 adds recording designation information indicating either "target" or "non-target" to the additional information of each RAW image data output from the communication unit A 107 and the communication unit B 108, as illustrated in FIG. 10.

When the merging recording function is ON, the recording control unit 204 of the external apparatus 200 determines whether the recording designation information of each RAW image data is "target" or "non-target." Then, if the recording designation information of the RAW image data is "non-target", the recording control unit 204 does not cause the storage device 205 to record the RAW image data. Thus, even when the same RAW image data is transmitted from each of the communication unit A 107 and the communication unit B 108, the external apparatus 200 can prioritize recording one of two or more same RAW image data. As a result, it is feasible to prevent the same RAW image data from being repetitively recorded in the storage device 205.

Figure 11:
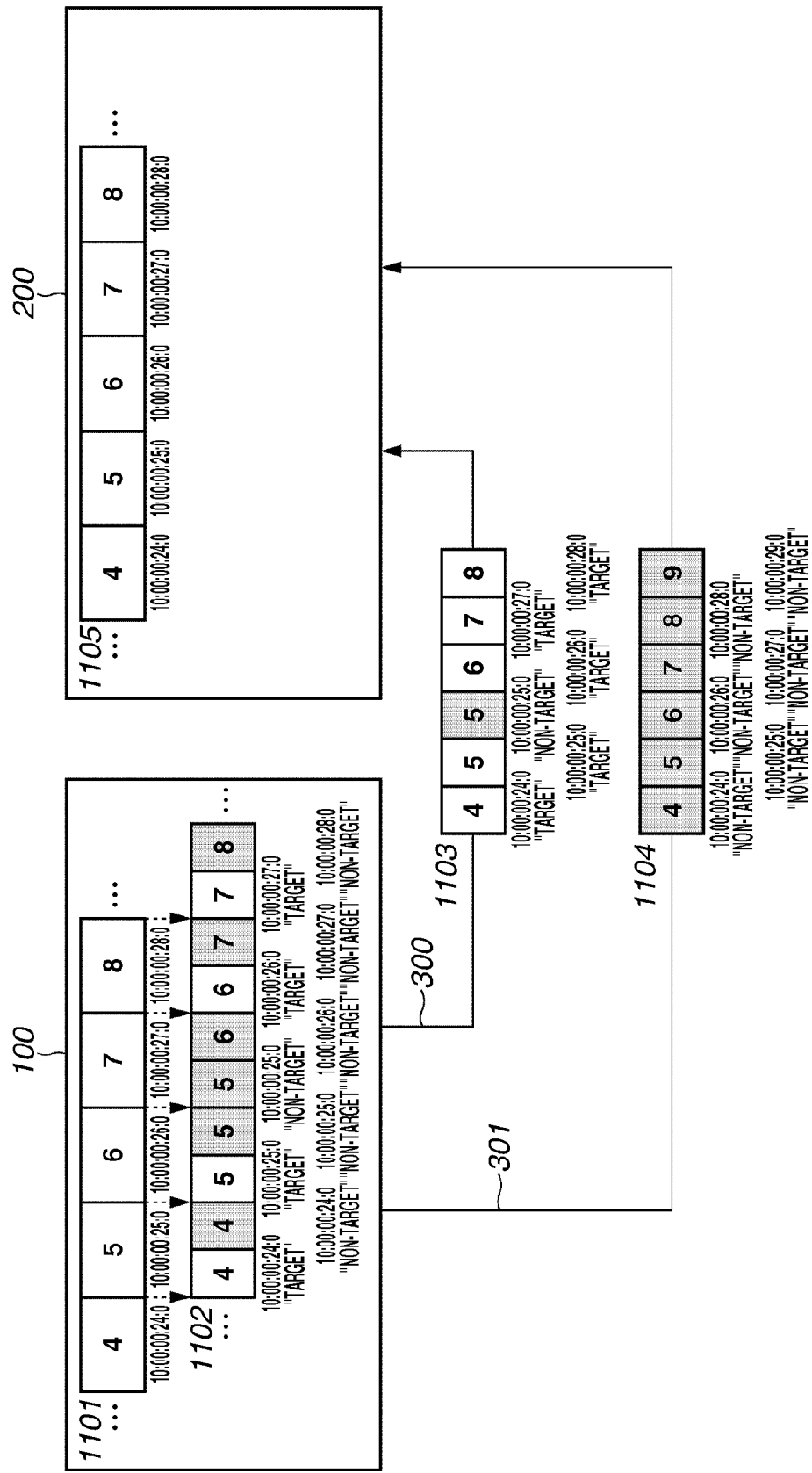
FIG. 11 illustrates another example of image data transmitting method that can be performed by the image data transmitting system according to the first exemplary embodiment.

Next, an image data transmitting method E32 that can be implemented between the image capture apparatus 100 and the external apparatus 200, as another example of image data transmitting method, is described in detail below with reference to FIG. 11. FIG. 11 illustrates details of the image data transmitting method E32.

The image data transmitting method E32 is employable when the image capture unit 101 generates a plurality of RAW image data at the frame rate of 29 frame/sec and each of the communication unit A 107 and the communication unit B 108 transmits a plurality of RAW image data at the frame rate of 30 frame/sec.

Further, the image data transmitting method E32 is employable when the frame rate of the moving image data reproduced from the storage device 104 is 29 frame/sec and each of the communication unit A 107 and the communication unit B 108 transmits a plurality of RAW image data at the frame rate of 30 frame/sec.

In FIG. 11, moving image data 1101 includes a plurality of RAW image data generated by the image capture unit 101. The frame rate of the moving image data 1101 is 29 frame/sec.

In FIG. 11, moving image data 1102 includes a plurality of RAW image data to be supplied to the communication unit A 107 and a plurality of RAW image data to be supplied to the communication unit B 108. The frame rate of the moving image data 1102 is 60 frame/sec.

In FIG. 11, moving image data 1103 includes a plurality of RAW image data transmitted from the communication unit A 107. The frame rate of the moving image data 1103 is 30 frame/sec.

In FIG. 11, moving image data 1104 includes a plurality of RAW image data transmitted from the communication unit B 108. The frame rate of the moving image data 1104 is 30 frame/sec.

In FIG. 11, moving image data 1105 is moving image data merged by the external apparatus 200 and recorded in the storage device 205. The frame rate of the moving image data 1105 is 29 frame/sec.

According to the image data transmitting method E32, the same RAW image data is transmitted once or more from each of the communication unit A 107 and the communication unit B 108. Therefore, the CPU 111 adds recording designation information indicating either "target" or "non-target" to the additional information of each RAW image data output from the communication unit A 107 and the communication unit B 108, as illustrated in FIG. 11.

When the merging recording function is ON, the recording control unit 204 of the external apparatus 200 determines whether the recording designation information of each RAW image data is "target" or "non-target." Then, if the recording designation information of the RAW image data is "non-target", the recording control unit 204 does not cause the storage device 205 to record the RAW image data. Thus, even when the same RAW image data is transmitted from each of the communication unit A 107 and the communication unit B 108, the external apparatus 200 can prioritize recording one of two or more the same RAW image data. As a result, it is feasible to prevent the same RAW image data from being repetitively recorded in the storage device 205.

Figure 12:
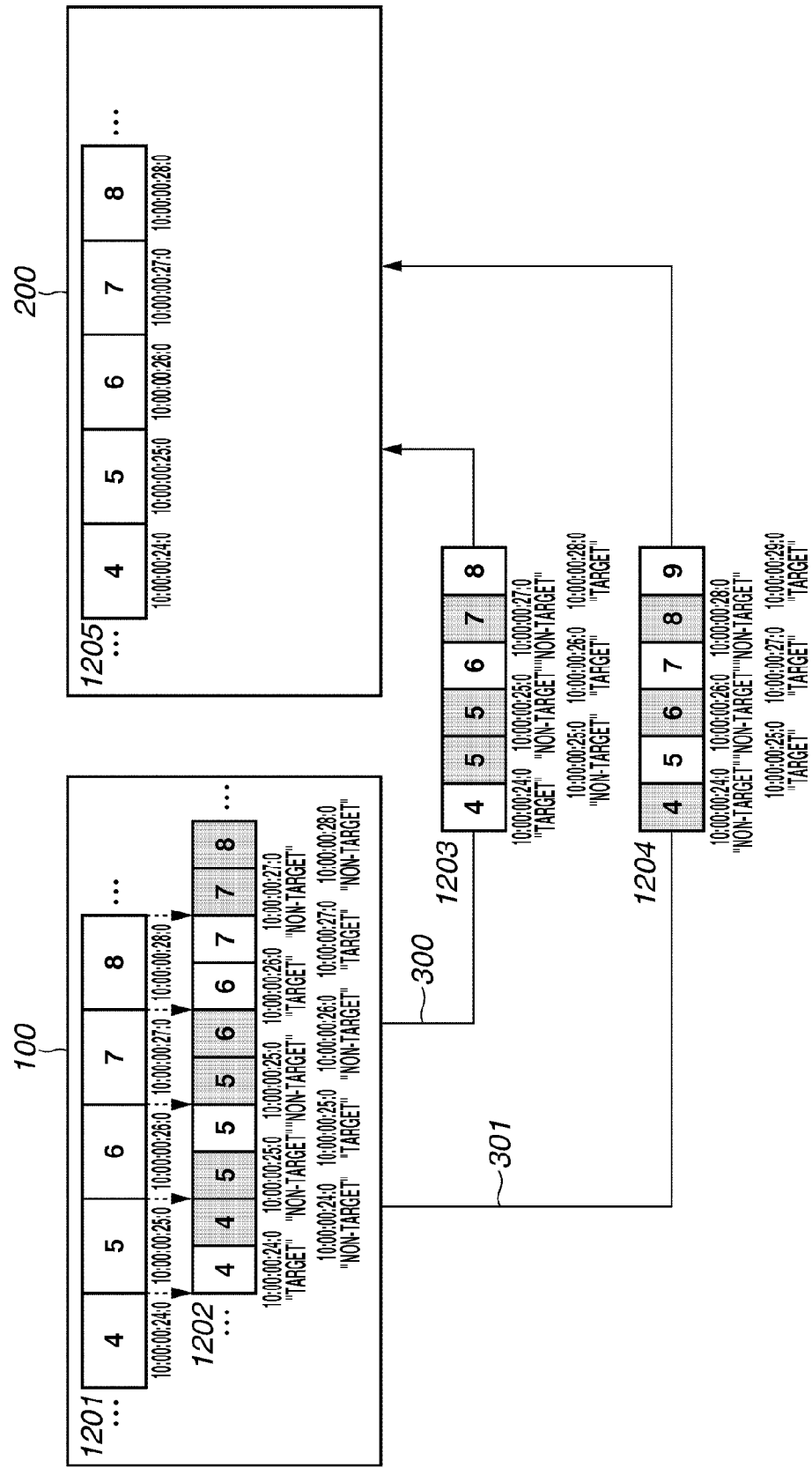
FIG. 12 illustrates another example of image data transmitting method that can be performed by the image data transmitting system according to the first exemplary embodiment.

Next, an image data transmitting method E33 that can be implemented between the image capture apparatus 100 and the external apparatus 200, as another example of image data transmitting method, is described in detail below with reference to FIG. 12. FIG. 12 illustrates details of the image data transmitting method E33.

The image data transmitting method E33 is employable when the image capture unit 101 generates a plurality of RAW image data at the frame rate of 29 frame/sec and each of the communication unit A 107 and the communication unit B 108 transmits a plurality of RAW image data at the frame rate of 30 frame/sec.

Further, the image data transmitting method E33 is employable when the frame rate of the moving image data reproduced from the storage device 104 is 29 frame/sec and each of the communication unit A 107 and the communication unit B 108 transmits a plurality of RAW image data at the frame rate of 30 frame/sec.

In FIG. 12, moving image data 1201 includes a plurality of RAW image data generated by the image capture unit 101. The frame rate of the moving image data 1201 is 29 frame/sec.

In FIG. 12, the moving image data 1202 includes a plurality of RAW image data to be supplied to the communication unit A 107 and a plurality of RAW image data to be supplied to the communication unit B 108. The frame rate of the moving image data 1202 is 60 frame/sec.

In FIG. 12, moving image data 1203 includes a plurality of RAW image data transmitted from the communication unit A 107. The frame rate of the moving image data 1203 is 30 frame/sec.

In FIG. 12, moving image data 1204 includes a plurality of RAW image data transmitted from the communication unit B 108. The frame rate of the moving image data 1204 is 30 frame/sec.

In FIG. 12, moving image data 1205 is moving image data merged by the external apparatus 200 and recorded in the storage device 205. The frame rate of the moving image data 1205 is 29 frame/sec.

According to the image data transmitting method E33, the same RAW image data is transmitted once or more from each of the communication unit A 107 and the communication unit B 108. Therefore, the CPU 111 adds recording designation information indicating either "target" or "non-target" to the additional information of each RAW image data output from the communication unit A 107 and the communication unit B 108, as illustrated in FIG. 12.

When the merging recording function is ON, the recording control unit 204 of the external apparatus 200 determines whether the recording designation information of each RAW image data is "target" or "non-target." Then, if the recording designation information of the RAW image data is "non-target", the recording control unit 204 does not cause the storage device 205 to record the RAW image data. Thus, even when the same RAW image data is transmitted from each of the communication unit A 107 and the communication unit B 108, the external apparatus 200 can prioritize recording one of two or more the same RAW image data. As a result, it is feasible to prevent the same RAW image data from being repetitively recorded in the storage device 205.

Figure 13:
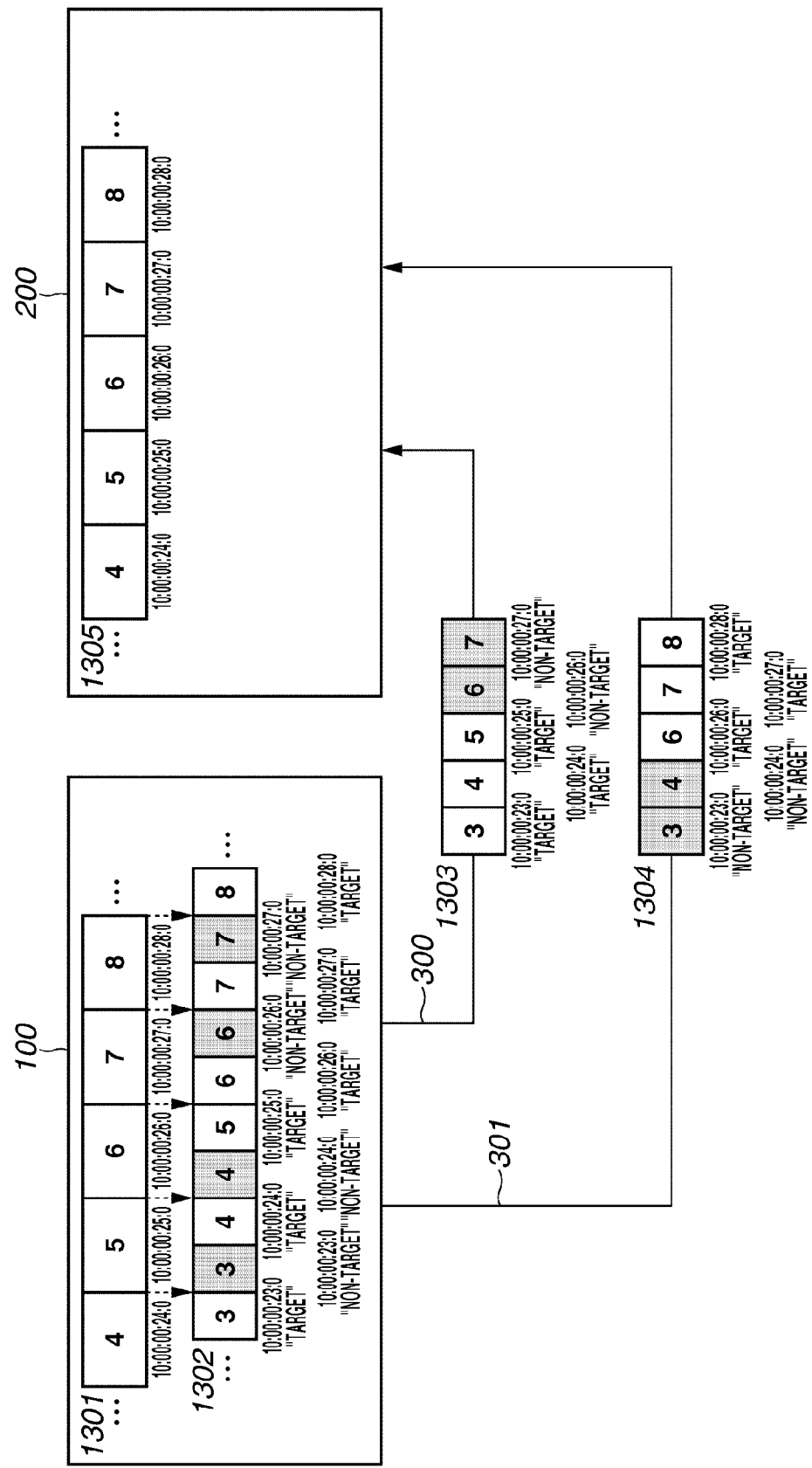
FIG. 13 illustrates another example of image data transmitting method that can be performed by the image data transmitting system according to the first exemplary embodiment.

Next, an image data transmitting method E41 that can be implemented between the image capture apparatus 100 and the external apparatus 200, as another example of image data transmitting method, is described below with reference to FIG. 13. FIG. 13 illustrates details of the image data transmitting method E41.

The image data transmitting method E41 is employable when the image capture unit 101 generates a plurality of RAW image data at the frame rate of 31 frame/sec and each of the communication unit A 107 and the communication unit B 108 transmits a plurality of RAW image data at the frame rate of 30 frame/sec.

Further, the image data transmitting method E41 is employable when the frame rate of the moving image data reproduced from the storage device 104 is 31 frame/sec and each of the communication unit A 107 and the communication unit B 108 transmits a plurality of RAW image data at the frame rate of 30 frame/sec.

In FIG. 13, the moving image data 1301 includes a plurality of RAW image data generated by the image capture unit 101. The frame rate of the moving image data 1301 is 31 frame/sec.

In FIG. 13, moving image data 1302 includes a plurality of RAW image data to be supplied to the communication unit A 107 and a plurality of RAW image data to be supplied to the communication unit B 108. The frame rate of the moving image data 1302 is 60 frame/sec.

In FIG. 13, moving image data 1303 includes a plurality of RAW image data transmitted from the communication unit A 107. The frame rate of the moving image data 1303 is 30 frame/sec.

In FIG. 13, moving image data 1304 includes a plurality of RAW image data transmitted from the communication unit B 108. The frame rate of the moving image data 1304 is 30 frame/sec.

In FIG. 13, moving image data 1305 is moving image data merged by the external apparatus 200 and recorded in the storage device 205. The frame rate of the moving image data 1305 is 31 frame/sec.

According to the image data transmitting method E41, the same RAW image data may be transmitted from each of the communication unit A 107 and the communication unit B 108. Therefore, the CPU 111 adds recording designation information indicating either "target" or "non-target" to the additional information of each RAW image data output from the communication unit A 107 and the communication unit B 108, as illustrated in FIG. 13.

When the merging recording function is ON, the recording control unit 204 of the external apparatus 200 determines whether the recording designation information of each RAW image data is "target" or "non-target." Then, if the recording designation information of the RAW image data is "non-target", the recording control unit 204 does not cause the storage device 205 to record the RAW image data. Thus, even when the same RAW image data is transmitted from each of the communication unit A 107 and the communication unit B 108, the external apparatus 200 can prioritize recording one of two the same RAW image data. As a result, it is feasible to prevent the same RAW image data from being repetitively recorded in the storage device 205.

Figure 14:
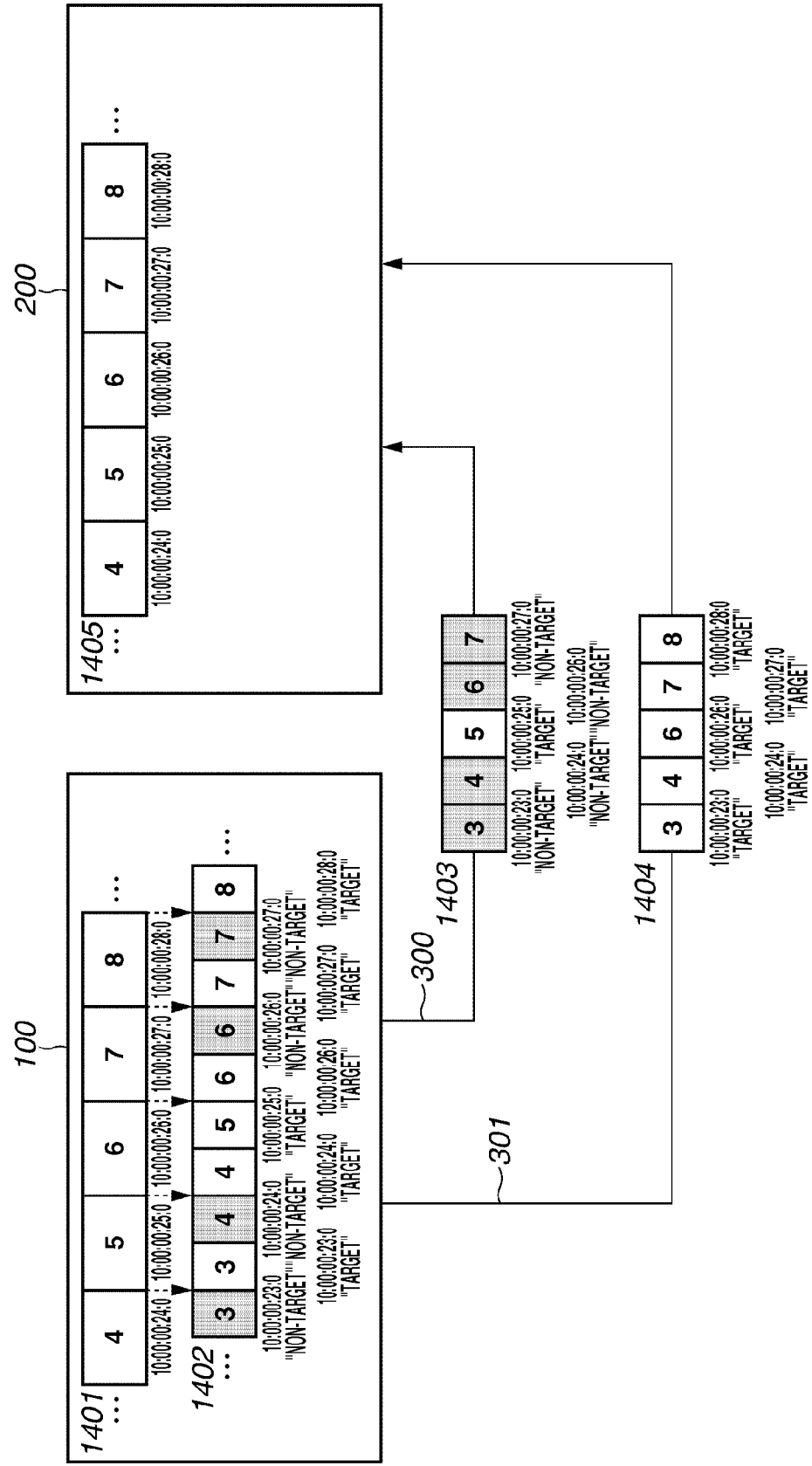
FIG. 14 illustrates another example of image data transmitting method that can be performed by the image data transmitting system according to the first exemplary embodiment.

Next, an image data transmitting method E42 that can be implemented between the image capture apparatus 100 and the external apparatus 200, as another example of image data transmitting method, is described in detail below with reference to FIG. 14. FIG. 14 illustrates details of the image data transmitting method E42.

The image data transmitting method E42 is employable when the image capture unit 101 generates a plurality of RAW image data at the frame rate of 31 frame/sec and each of the communication unit A 107 and the communication unit B 108 transmits a plurality of RAW image data at the frame rate of 30 frame/sec.

Further, the image data transmitting method E42 is employable when the frame rate of the moving image data reproduced from the storage device 104 is 31 frame/sec and each of the communication unit A 107 and the communication unit B 108 transmits a plurality of RAW image data at the frame rate of 30 frame/sec.

In FIG. 14, moving image data 1401 includes a plurality of RAW image data generated by the image capture unit 101. The frame rate of the moving image data 1401 is 31 frame/sec.

In FIG. 14, moving image data 1402 includes a plurality of RAW image data to be supplied to the communication unit A 107 and a plurality of RAW image data to be supplied to the communication unit B 108. The frame rate of the moving image data 1402 is 60 frame/sec.

In FIG. 14, moving image data 1403 includes a plurality of RAW image data transmitted from the communication unit A 107. The frame rate of the moving image data 1403 is 30 frame/sec.

In FIG. 14, moving image data 1404 includes a plurality of RAW image data transmitted from the communication unit B 108. The frame rate of the moving image data 1404 is 30 frame/sec.

In FIG. 14, moving image data 1405 is moving image data merged by the external apparatus 200 and recorded in the storage device 205. The frame rate of the moving image data 1405 is 31 frame/sec.

According to the image data transmitting method E42, the same RAW image data may be transmitted from each of the communication unit A 107 and the communication unit B 108. Therefore, the CPU 111 adds recording designation information indicating either "target" or "non-target" to the additional information of each RAW image data output from the communication unit A 107 and the communication unit B 108, as illustrated in FIG. 14.

When the merging recording function is ON, the recording control unit 204 of the external apparatus 200 determines whether the recording designation information of each RAW image data is "target" or "non-target." Then, if the recording designation information of the RAW image data is "non-target", the recording control unit 204 does not cause the storage device 205 to record the RAW image data. Thus, even when the same RAW image data is transmitted from each of the communication unit A 107 and the communication unit B 108, the external apparatus 200 can prioritize recording one of two the same RAW image data. As a result, it is feasible to prevent the same RAW image data from being repetitively recorded in the storage device 205.

Figure 15:
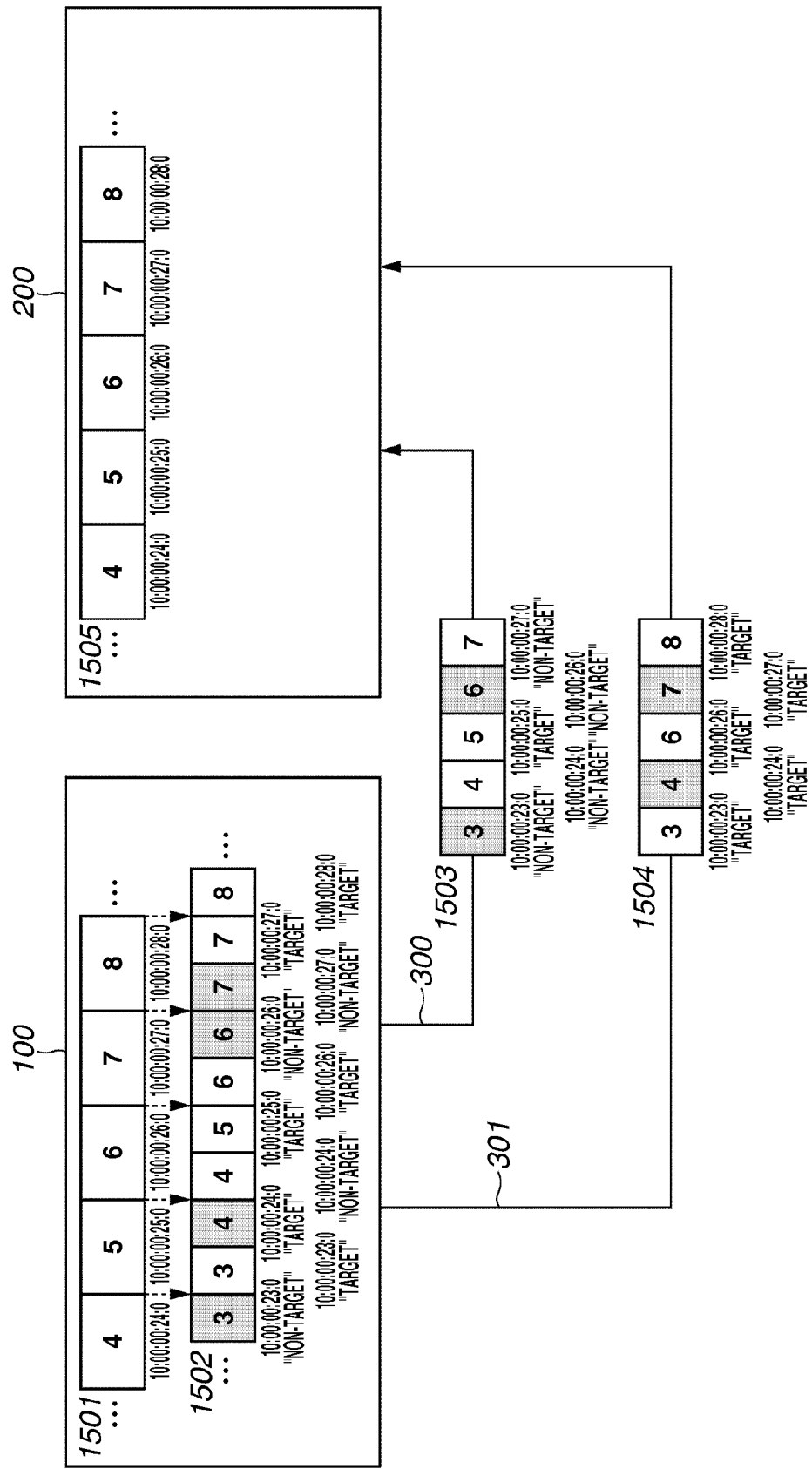
FIG. 15 illustrates another example of image data transmitting method that can be performed by the image data transmitting system according to the first exemplary embodiment.

Next, an image data transmitting method E43 that can be implemented between the image capture apparatus 100 and the external apparatus 200, as another example of image data transmitting method, is described in detail below with reference to FIG. 15. FIG. 15 illustrates details of the image data transmitting method E43.

The image data transmitting method E43 is employable when the image capture unit 101 generates a plurality of RAW image data at the frame rate of 31 frame/sec and each of the communication unit A 107 and the communication unit B 108 transmits a plurality of RAW image data at the frame rate of 30 frame/sec.

Further, the image data transmitting method E43 is employable when the frame rate of the moving image data reproduced from the storage device 104 is 31 frame/sec and each of the communication unit A 107 and the communication unit B 108 transmits a plurality of RAW image data at the frame rate of 30 frame/sec.

In FIG. 15, moving image data 1501 includes a plurality of RAW image data generated by the image capture unit 101. The frame rate of the moving image data 1501 is 31 frame/sec.

In FIG. 15, moving image data 1502 includes a plurality of RAW image data to be supplied to the communication unit A 107 and a plurality of RAW image data to be supplied to the communication unit B 108. The frame rate of the moving image data 1502 is 60 frame/sec.

In FIG. 15, moving image data 1503 includes a plurality of RAW image data transmitted from the communication unit A 107. The frame rate of the moving image data 1503 is 30 frame/sec.

In FIG. 15, moving image data 1504 includes a plurality of RAW image data transmitted from the communication unit B 108. The frame rate of the moving image data 1504 is 30 frame/sec.

In FIG. 15, moving image data 1505 is moving image data merged by the external apparatus 200 and recorded in the storage device 205. The frame rate of the moving image data 1505 is 31 frame/sec.

According to the image data transmitting method E43, the same RAW image data may be transmitted from each of the communication unit A 107 and the communication unit B 108. Therefore, the CPU 111 adds recording designation information indicating either "target" or "non-target" to the additional information of each RAW image data output from the communication unit A 107 and the communication unit B 108, as illustrated in FIG. 15.

When the merging recording function is ON, the recording control unit 204 of the external apparatus 200 determines whether the recording designation information of each RAW image data is "target" or "non-target." Then, if the recording designation information of the RAW image data is "non-target", the recording control unit 204 does not cause the storage device 205 to record the RAW image data. Thus, even when the same RAW image data is transmitted from each of the communication unit A 107 and the communication unit B 108, the external apparatus 200 can prioritize recording one of two the same RAW image data. As a result, it is feasible to prevent the same RAW image data from being repetitively recorded in the storage device 205.

As mentioned above, the image capture apparatus 100 can transmit moving image data having an image size (e.g., the number of pixels in the horizontal and vertical directions) larger than 1920×1080 to the external apparatus 200 via a plurality of transmission paths.

Further, the image capture apparatus 100 can generate time code information that corresponds to each frame of RAW image data included in the moving image data and can transmit each frame of the RAW image data together with the time code information thereof to the external apparatus 200. Thus, the external apparatus 200 can correctly rearrange RAW image data corresponding to a plurality of frames based on the time code information corresponding to each frame of the RAW image data.

Further, even when the same RAW image data is transmitted from the image capture apparatus 100 to the external apparatus 200 via each of a plurality of transmission paths, the external apparatus 200 can detect the RAW image data. Thus, it is feasible to prevent the same RAW image data from being repetitively recorded.

The first exemplary embodiment is not limited to the above-mentioned configuration and can be modified in various ways. For example, the number of transmission paths connecting the image capture apparatus 100 and the external apparatus 200 is not limited to two, although the image capture apparatus 100 and the external apparatus 200 are connected via two transmission paths in the first exemplary embodiment. For example, the image capture apparatus 100 and the external apparatus 200 can be modified in such a way as to connect the image capture apparatus 100 with the external apparatus 200 via three or more transmission paths.

Further, all of the plurality of transmission paths described in the first exemplary embodiment can conform to the requirements of SDI standards. However, for example, the whole or apart of the plurality of transmission paths can be changed to transmission paths that conform to the requirements of other standards. For example, the whole or a part of the plurality of transmission paths can be changed to transmission paths that conform to the requirements of High-Definition Multimedia Interface (HDMI) standards. For example, the whole or a part of the plurality of transmission paths can be changed to transmission paths that conform to the requirements of Universal Serial Bus (USB) standards. For example, the whole or apart of the plurality of transmission paths can be changed to transmission paths that conform to the requirements of Thunderbolt standards. For example, the whole or apart of the plurality of transmission paths can be changed to transmission paths that conform to the requirements of DisplayPort standards.

Further, all of the plurality of transmission paths described in the first exemplary embodiment can be wired transmission paths. However, for example, the whole or a part of the plurality of transmission paths can be changed to wireless transmission paths. For example, the whole or a part of the plurality of transmission paths can be changed to transmission paths that conform to the requirements of the wireless LAN standards. For example, the whole or a part of the plurality of transmission paths can be changed to transmission paths that can realize optical communications.

Further, all of the plurality of transmission paths described in the first exemplary embodiment can be physical transmission paths. However, for example, the whole or a part of the plurality of transmission paths can be changed to logical transmission paths.

Further, the recording start command described in the first exemplary embodiment is transmitted from the image capture apparatus 100 to the external apparatus 200 via all of a plurality of transmission paths. However, the present invention is not limited to the above-mentioned exemplary embodiment. For example, the image capture apparatus 100 and the external apparatus 200 can be modified in such a way as to transmit the recording start command from the image capture apparatus 100 to the external apparatus 200 via at least one of a plurality of transmission paths.

Further, the recording stop command described in the first exemplary embodiment is transmitted from the image capture apparatus 100 to the external apparatus 200 via all of a plurality of transmission paths. However, the present invention is not limited to the above-mentioned exemplary embodiment. For example, the image capture apparatus 100 and the external apparatus 200 can be modified in such a way as to transmit the recording stop command from the image capture apparatus 100 to the external apparatus 200 via at least one of a plurality of transmission paths.

Second Exemplary Embodiment

A personal computer, a microcomputer, or a central processing unit (CPU) can execute a program to realize various functions and processes described in the first exemplary embodiment. In a second exemplary embodiment, the personal computer, the microcomputer, and the CPU are collectively referred to as a "computer X." Further, in the second exemplary embodiment, a program that can realize various functions and processes described in the first exemplary embodiment is referred to as a "program Y" that can control the computer X.

Various functions and processes described in the first exemplary embodiment can be performed by the computer X when the computer X executes the program Y. In this case, the program Y can be supplied to the computer X via a computer-readable storage medium. The computer-readable storage medium according to the second exemplary embodiment can be any one of a hard disk device, an optical disk, a compact disc read only memory (CD-ROM), a CD-recordable (CD-R), a memory card, a read only memory (ROM), and a random access memory (RAM). Further, the computer-readable storage medium according to the second exemplary embodiment is a non-transitory storage medium.

While the present invention has been described with reference to the disclosed exemplary embodiments, it is to be understood that the present invention is not limited to the disclosed exemplary embodiments. The scope of the following claims is to be accorded the broadest interpretation so as to encompass all modifications and equivalent structures.

This application claims priority from Japanese Patent Application No. 2012-090603 filed Apr. 11, 2012, which is hereby incorporated by reference herein in its entirety.

What is claimed is:

1. A transmitting apparatus comprising:
   a moving image data generating unit that generates moving image data including a plurality of image data;
   a determination unit that determines first image data from the plurality of image data included in the moving image data to satisfy a first condition, and determines second image data from the plurality of image data included in the moving image data to satisfy a second condition;
   an identification (ID) information generating unit that generates ID information indicating that the plurality of image data included in the moving image data belongs to the moving image data;
   a time code information generating unit that generates first time code information corresponding to the first image data and second time code information corresponding to the second image data;
   a first transmitting unit that transmits, to an external apparatus, the first image data with the ID information and the first time code information, wherein the ID information indicates that the first image data included in the moving image data belongs to the moving image data; and
   a second transmitting unit that transmits, to the external apparatus, the second image data with the ID information and the second time code information, wherein the ID information indicates that the second image data included in the moving image data belongs to the moving image data,
   wherein predetermined information is transmitted with the first image data or the second image data if the first image data and the second image data are the same, and the predetermined information indicates that one of the first image data and the second image data is used for recording or displaying, and
   wherein the moving image data generating unit, the determination unit, the ID information generating unit, the time code information generating unit, the first transmitting unit, and the second transmitting unit are implemented by a processor.

2. The transmitting apparatus according to claim 1, wherein the first condition indicates that image data corresponds to an odd-number frame, and the second condition indicates that image data corresponds to an even-number frame.

3. The transmitting apparatus according to claim 1, wherein the first condition indicates that image data corresponds to an even-number frame, and the second condition indicates that image data corresponds to an odd-number frame.

4. The transmitting apparatus according to claim 1, wherein the transmitting apparatus includes a video camera.

5. The transmitting apparatus according to claim 1, wherein the transmitting apparatus includes a mobile phone with a camera.

6. The transmitting apparatus according to claim 1, wherein the transmitting apparatus includes a computer with a camera.

7. The transmitting apparatus according to claim 1, wherein the first image data or the second image data is transmitted to the external apparatus via a wireless transmission path.

8. A method comprising:
- generating moving image data including a plurality of image data;
- determining first image data from the plurality of image data included in the moving image data to satisfy a first condition, and determining second image data from the plurality of image data included in the moving image data to satisfy a second condition;
- generating ID information indicating that the plurality of image data included in the moving image data belongs to the moving image data;
- generating first time code information corresponding to the first image data and second time code information corresponding to the second image data;
- transmitting, to an external apparatus, the first image data with the ID information and the first time code information, wherein the ID information indicates that the first image data included in the moving image data belongs to the moving image data; and
- transmitting, to the external apparatus, the second image data with the ID information and the second time code information, wherein the ID information indicates that the second image data included in the moving image data belongs to the moving image data,
- wherein predetermined information is transmitted with the first image data or the second image data if the first image data and the second image data are the same, and the predetermined information indicates that one of the first image data and the second image data is used for recording or displaying.

9. A non-transitory computer-readable storage medium that stores a program to cause a computer to execute a method, the method comprising:
- generating moving image data including a plurality of image data;
- determining first image data from the plurality of image data included in the moving image data to satisfy a first condition, and determining second image data from the plurality of image data included in the moving image data to satisfy a second condition;
- generating ID information indicating that the plurality of image data included in the moving image data belongs to the moving image data;
- generating first time code information corresponding to the first image data and second time code information corresponding to the second image data;
- transmitting, to an external apparatus, the first image data with the ID information and the first time code information, wherein the ID information indicates that the first image data included in the moving image data belongs to the moving image data; and
- transmitting, to the external apparatus, the second image data with the ID information and the second time code information, wherein the ID information indicates that the second image data included in the moving image data belongs to the moving image data,
- wherein predetermined information is transmitted with the first image data or the second image data if the first image data and the second image data are the same, and the predetermined information indicates that one of the first image data and the second image data is used for recording or displaying.

10. A receiving apparatus comprising:
- a first receiving unit that receives, from an external apparatus, first image data with identification (ID) information and first time code information corresponding to the first image data, wherein the ID information indicates that the first image data included in moving image data belongs to the moving image data;
- a second receiving unit that receives, from the external apparatus, second image data with the ID information and second time code information corresponding to the second image data, wherein the ID information indicates that the second image data included in the moving image data belongs to the moving image data; and
- a determination unit that determines an order of the first image data and the second image data by using the ID information and the first time code information which are received with the first image data and the ID information and the second time code information which are received with the second image data,
- wherein predetermined information is received with the first image data or the second image data if the first image data and the second image data are the same, and the predetermined information indicates that one of the first image data and the second image data is used for recording or displaying, and
- wherein the first receiving unit, the second receiving unit, and the determination unit are implemented by a processor.

11. The receiving apparatus according to claim 10, further comprising a recording control unit that records the first image data and the second image data on a recording medium according to the order determined by the determination unit.

12. The receiving apparatus according to claim 10, further comprising a display control unit that causes a display unit to display the first image data and the second image data according to the order determined by the determination unit.

13. The receiving apparatus according to claim 10, wherein the receiving apparatus includes a recording apparatus.

14. The receiving apparatus according to claim 10, wherein the receiving apparatus includes a display apparatus.

15. The receiving apparatus according to claim 10, wherein the first image data or the second image data is received from the external apparatus via a wireless transmission path.

16. A method comprising:
- receiving, from an external apparatus, first image data with identification (ID) information and first time code information corresponding to the first image data, wherein the ID information indicates that the first image data included in moving image data belongs to the moving image data;
- receiving, from the external apparatus, second image data with the ID information and second time code information corresponding to the second image data, wherein the ID information indicates that the second image data included in the moving image data belongs to the moving image data; and
- determining an order of the first image data and the second image data by using the ID information and the first time code information which are received with the first image data and the ID information and the second time code information which are received with the second image data,
- wherein predetermined information is received with the first image data or the second image data if the first image data and the second image data are the same, and the predetermined information indicates that one of the first image data and the second image data is used for recording or displaying.

17. A non-transitory computer-readable storage medium that stores a program to cause a computer to execute a method, the method comprising:

receiving, from an external apparatus, first image data with identification (ID) information and first time code information corresponding to the first image data, wherein the ID information indicates that the first image data included in moving image data belongs to the moving image data;

receiving, from the external apparatus, second image data with the ID information and second time code information corresponding to the second image data, wherein the ID information indicates that the second image data included in the moving image data belongs to the moving image data; and determining an order of the first image data and the second image data by using the ID information and the first time code information which are received with the first image data and the ID information and the second time code information which are received with the second image data;

wherein predetermined information is received with the first image data or the second image data if the first image data and the second image data are the same, and the predetermined information indicates that one of the first image data and the second image data is used for recording or displaying.

\* \* \* \* \*